(12) United States Patent
Hood et al.

(10) Patent No.: US 9,313,939 B2
(45) Date of Patent: Apr. 19, 2016

(54) SYSTEM, METHOD, AND COMPUTER PROGRAM PRODUCT FOR AUTOMATED HIGH-THROUGHPUT SEED SAMPLE ALIQUOT PREPARATION, TREATMENT AND DISPERSAL

(75) Inventors: C. Fred Hood, Naples, FL (US); James L. Hunter, Maxwell, IA (US); Timothy P. Meyer, Des Moines, IA (US); Lyndon J. Schroeder, Urbandale, IA (US)

(73) Assignee: PIONEER HI-BRED INTERNATIONAL INC, Johnston, IA (US)

( * ) Notice: Subject to any disclaimer, the term of this patent is extended or adjusted under 35 U.S.C. 154(b) by 2142 days.

(21) Appl. No.: 11/774,230

(22) Filed: Jul. 6, 2007

(65) Prior Publication Data

US 2008/0009962 A1    Jan. 10, 2008

Related U.S. Application Data

(60) Provisional application No. 60/806,684, filed on Jul. 6, 2006.

(51) Int. Cl.
  *A01C 1/00*    (2006.01)
(52) U.S. Cl.
  CPC ........................................ *A01C 1/00* (2013.01)
(58) Field of Classification Search
  USPC .............. 700/230, 219; 209/938, 936; 53/428
  See application file for complete search history.

(56) References Cited

U.S. PATENT DOCUMENTS

| 6,078,635 | A | 6/2000 | DuBois |
| 6,186,194 | B1 | 2/2001 | Poupon |
| 6,706,989 | B2 * | 3/2004 | Hunter et al. ................. 209/577 |
| 2003/0079682 | A1 * | 5/2003 | Renyer et al. ................. 118/303 |
| 2005/0060958 | A1 * | 3/2005 | Harmon et al. ................. 53/428 |

OTHER PUBLICATIONS

The International Search Report and Written Opinion for International Appl. No. PCT/US2007/072945, mailed Mar. 12, 2008, completed Mar. 4, 2008.
"Contador Seed Counter," Hoffman Manufacturing, Inc., <http://www.hoffmanmfg.com/entry.php?id=447>, printed May 4, 2006.

(Continued)

*Primary Examiner* — Ramya Burgess
(74) *Attorney, Agent, or Firm* — Pioneer Hi-Bred Int'l, Inc.

(57) ABSTRACT

A system, method, and computer program product for separating a seed aliquot from a bulk sample and preparing the seed aliquot for downstream research purposes is provided. The system embodiments may comprise a counter device, which is configured to receive at least a portion of the bulk sample and to separate the seed aliquot from the portion of the bulk sample, and a packaging device, which is configured to receive the separated seed aliquot and to dispense the aliquot into an aliquot container. Other embodiments may include a conveyor system for advancing the bulk sample and/or seed aliquot along a conveyance path that may be determined from a research protocol received from an input source. Various embodiments of the present invention may maintain an identity of the seed aliquot as it is advanced along the conveyance path and may selectively subject the seed aliquot to a variety of processing steps in accordance with the research protocol with little or no manual control or supervision.

25 Claims, 13 Drawing Sheets

(56) References Cited

OTHER PUBLICATIONS

"Count-A-Pak Seed Counter," Seedburo Equipment Company, <http://www.seedburo.com/online_cat/categ07/801.asp>, printed May 4, 2006.

"Batch Lab Treater," Seedburo Equipment Company, <http://www.seedburo.com/online_cat/categ07/blt.asp>, printed May 4, 2006.

"Cimbria Heid Centricoater Seed Coaters," Seedburo Equipment Company, <http://www.seedburo.com/online_cat/categ07/cc.asp>, printed May 4, 2006.

"Liquid Seed Treaters," brochure from Wintersteiger, available at <http://www.wintersteiger.com/E/pdf/E_Feuchtbeizger_screen.pdf>, brochure published Mar. 20, 2005.

\* cited by examiner

SYSTEM, METHOD, AND COMPUTER PROGRAM PRODUCT FOR AUTOMATED HIGH-THROUGHPUT SEED SAMPLE ALIQUOT PREPARATION, TREATMENT AND DISPERSAL

CROSS-REFERENCE TO RELATED APPLICATIONS

This application claims priority from U.S. Provisional Application No. 60/806,684, filed Jul. 6, 2006, which is hereby incorporated herein in its entirety by reference.

FIELD OF THE INVENTION

The various embodiments of the present invention relate generally to an automated system and method for separating a seed aliquot from a bulk sample and packaging the seed aliquot for planting or other downstream research purposes. More specifically, embodiments of the present invention provide a counter device for separating the seed aliquot from the bulk sample and packaging the seed aliquot in an aliquot container having indicia for identifying the seed aliquot. According to some embodiments, the system may also provide treatment devices for treating the bulk sample and/or the seed aliquot with a treatment compound prior to packaging and dispersal at a planting location in an agricultural research plot.

BACKGROUND OF THE INVENTION

Plant breeding, plant product development, plant product characterization, and plant product commercialization processes often require, for each genotype or breeding line, the creation of a large number of seed aliquots from a bulk or composite seed sample. For example, in agricultural research, it is often necessary to segregate a seed aliquot from a bulk sample such that the seed aliquot includes one or more selected seeds (representing a statistically-significant population, for example). Such seed aliquots must also sometimes be treated with a selected treatment compound (such as a particular fungicide or insecticide, for example) and packaged with a unique indicia that allows a researcher or field technician to easily identify the seed aliquot, as well as the handling history and treatment history of the seed aliquot.

High-throughput bulk seed sample processing systems for corn and other plant seeds are described, for example, in U.S. Pat. No. 6,706,989, which is incorporated herein by reference in its entirety. Such systems provide automated high-throughput capacity for cleaning and sorting a bulk sample of seeds and placing the bulk sample in a bag or other bulk container with identifying information. However, conventional labor-intensive processes must be used in downstream steps for separating seed aliquots from the bulk sample and sorting the seed aliquots into seed packets or other containers in preparation for planting. For example, in conventional corn research processes, seed aliquots must be counted out by hand, carried by hand to other treatment stations (such as a fungicide treatment bath), and packaged by hand. Such conventional research processes also rely heavily on written records to maintain the identification and traceability of the seed aliquot as it is advanced from the counting step to planting in a specified research plot. Such conventional research processes for counting, treating, packaging, and planting a seed aliquot are not only labor-intensive, but may also introduce error that may be detrimental to the integrity of the results of the experiments that rely on accurate seed aliquot counts, accurate documentation of the treatments applied to each seed aliquot, and accurate placement of the seed aliquot in a specific research plot (such as, in a specific row of a research field).

Thus in order to facilitate the accurate separation, preparation, and packaging of seed aliquots, there is a need in the art for an automated system and method for receiving a research protocol and automatically preparing a seed aliquot for planting in response to the received research protocol. There further exists a need in the art for a system and method that is less labor intensive than conventional seed aliquot procedures and accurately records and preserves an identity of the seed aliquot including, for example, the bulk sample from which the seed aliquot was counted, the identity of any treatments applied to the seed aliquot, and a location or identity of a planting location where the seed aliquot is to be planted.

SUMMARY OF THE INVENTION

The embodiments of the present invention satisfy the needs listed above and provide other advantages as described below. Embodiments of the present invention may include a system for segregating a seed aliquot from a bulk sample and preparing the seed aliquot for planting in an agricultural research plot. In one embodiment, the system comprises a counter device and a packaging device located on a conveyance path. The counter device is configured to receive at least a portion of the bulk sample and to separate the seed aliquot from the portion of the bulk sample such that the seed aliquot includes a selected number of seeds. In some embodiments, the selected number of seeds may be determined at least in part from the received research protocol. In some system embodiments, the counter device may, in some embodiments, be configured to singulate seeds from the bulk sample. The counter device may be further configured to pass the singulated seeds through a sensor device for counting the singulated seeds so as to control and/or determine the selected number of seeds within the seed aliquot. The system also comprises a packaging device in communication with the controller and located on the conveyance path downstream of the counter device. The packaging device is configured to receive the separated seed aliquot and to dispense the seed aliquot into an aliquot container. In some embodiments, indicia may be associated with the seed aliquot. In some embodiments, the indicia pertains to an identity of the bulk sample and/or an identity of the research data set corresponding to the received research protocol. Thus, some system embodiments of the present invention may ensure that the prepared seed aliquot is identifiable at least partially from the indicia. The system may, in some embodiments, further comprise a device configured to generate a visual representation of the indicia on a surface of the aliquot container. In some embodiments, the system further comprises a device for generating a label comprising the indicia of the seed aliquot. Embodiments may also include a device configured to affix the printed label to the aliquot container.

Some system embodiments may further comprise a one or more data stores in communication with the one or more controllers. The one or more data stores may comprise the research protocol, including the research data set corresponding to the seed aliquot. Data within the research data set may include, but is not limited to: a seed aliquot genotype or pedigree; bulk sample source information; the selected number of seeds within the seed aliquot; a planting location wherein the packaged seed aliquot is to be dispersed; an inventory amount of the bulk sample; a treatment type; and combinations of such data.

In some embodiments, the packaging device may be configured to be capable of dispensing the seed aliquot into a specialized aliquot container. For example, in some embodiments, the aliquot container may comprise a well portion for receiving the seed aliquot and a lid portion for securing the seed aliquot within the well portion. In such embodiments, the packaging device may comprise a packaging conveyor for advancing the aliquot container to a filling position in communication with the conveyance path and automated mechanical elements for placing the aliquot container on the conveyance path and/or securing the lid portion in a closed position relative to the well portion of the aliquot container after the seed aliquot is dispensed into the aliquot container. In other embodiments, the aliquot container may comprise a plate including a plurality of wells for receiving a corresponding plurality of seed aliquots wherein the plurality of wells are arranged in an array corresponding to the received research protocol. In such embodiments, the packaging device may comprise an actuator device for advancing each of the plurality of wells to a filling position in communication with the conveyance path, such that each of the plurality of seed aliquots is dispensed into the corresponding plurality of wells of the plate in accordance with the received research protocol. In some such embodiments, the actuator device may comprise an automated movable X-Y table including a register device, wherein the register device is configured to receive the aliquot container in a fixed position relative to the automated movable X-Y table. In other embodiments, the actuator device may comprise an X-Y gantry system, an X-Y-Z gantry system, a robotic arm configured to move in multiple axes, or combinations thereof.

According to some system embodiments, the system may further comprise one or more treatment devices for treating at least a portion of the bulk sample and/or the separated seed aliquot with one or more treatments or coatings (such as fungicides, insecticides, or combinations thereof). For example, some system embodiments further comprise an aliquot treatment device which may be in communication with the controller and located on the conveyance path downstream of the counter device. The aliquot treatment device may be configured to treat the separated seed aliquot with at least one aliquot treatment compound.

Other system embodiments may also comprise a bulk sample treatment device which may be in communication with the controller and located on the conveyance path upstream of the counter device for treating at least a portion of the bulk sample with at least one bulk sample treatment compound. According to some such system embodiments, indicia may be associated with the seed aliquot and may pertain to an identity of the at least one aliquot treatment compound and/or the at least one bulk sample treatment compound.

Other system embodiments of the present invention may further comprise a conveyor device in communication with the controller and cooperable therewith to determine the conveyance path at least partially from the research protocol. The conveyor device may be capable of automatically conveying the bulk sample and the seed aliquot along the determined conveyance path such that the separated seed aliquot is maintained separately from the bulk sample along the determined conveyance path in accordance with the received research protocol. For example, in some embodiments, the conveyor device may comprise at least one pneumatic conveyor device wherein the conveyance path determined by the conveyor device comprises at least one pneumatic conveyance tube. According to additional system embodiments, the system components may be stacked substantially vertically such that the conveyance path may be oriented along a substantially vertical axis. In such embodiments, the conveyor device may comprise at least one hopper device including at least one valve mechanism operably engaged therewith for selectively allowing the separated seed aliquot to advance along the determined conveyance path in response to a gravity force.

Various embodiments of the present invention may also provide methods and computer program products for segregating a seed aliquot from a bulk sample and preparing the seed aliquot for planting in an agricultural research plot. Such embodiments comprise steps for: receiving a research protocol including a research data set corresponding to the seed aliquot; separating the seed aliquot from the bulk sample using a counter device; and packaging the separated seed aliquot in an aliquot container using a packaging device. Other embodiments may associate indicia with the seed aliquot. In some embodiments, the indicia may pertain to an identity of the bulk sample and/or an identity of the research data set corresponding to the received research protocol. Thus, in some embodiments the method and computer program product embodiments of the present invention may ensure that the prepared seed aliquot is identifiable at least partially from the indicia. Some method and/or computer program product embodiments may further comprise generating a visual representation of the indicia on a surface of the aliquot container. For example, some embodiments may comprise steps for generating a label comprising the assigned indicia of the seed aliquot. Other embodiments may comprise affixing the printed label to the aliquot container in order to better identify the prepared seed aliquot for further downstream processing.

The receiving a research protocol step may, in some embodiments, further comprise receiving the research protocol from an input source that may include, but is not limited to: one or more data stores; a user interface for receiving a user input comprising a research data set; a memory device for storing default values comprising the research data set; and combinations of such input sources. According to some embodiments, the research data set of the received research protocol may comprise data that includes, but is not limited to: a seed aliquot genotype or pedigree; bulk sample source information; the selected number of seeds within the seed aliquot; a planting location wherein the packaged seed aliquot is to be dispersed; an inventory amount of the bulk sample; a treatment type; and combinations of such data. Other method and/or computer program embodiments of the present invention may further comprise steps for determining the selected number of seeds within the seed aliquot based at least in part on the inventory of the bulk sample (which, as described above, may be received as part of the research data set). Furthermore, the research data set of the received research protocol may, in some embodiments, further comprise the identity of the at least one aliquot treatment compound and/or the identity of the at least one bulk sample treatment compound.

Some additional embodiments of the present invention further comprise steps for treating the separated seed aliquot with at least one aliquot treatment compound using an aliquot treatment device and/or treating at least a portion of the bulk sample with at least one bulk sample treatment compound using a bulk sample treatment device. In such embodiments, the indicia may pertain to an identity of the at least one aliquot treatment compound and/or the at least one bulk sample treatment compound. Other embodiments further comprise conveying steps for: automatically conveying the separated seed aliquot between the separating and the packaging steps; automatically conveying the separated seed aliquot between the separating and the treating steps; and automatically conveying the treated bulk sample between the treating and the separating steps.

Thus the various embodiments of the seed aliquot preparation system and method of the present invention provide many advantages that may include, but are not limited to: providing a system and method capable of substantially automating many and/or all of the steps involved in preparing, treating, and/or distributing a seed aliquot in accordance with a research protocol; maintaining separate seed aliquots throughout the seed aliquot preparation and treatment process such that the seed aliquots remain free of cross-contamination with other seed aliquots and/or treatments applied thereto; providing a system and method for accurately tracking and/or identifying individual seed aliquots separated from a particular bulk sample based on a number of different research data including an identity of the bulk sample; and/or providing a "smart" seed aliquot preparation system capable of determining the population size (i.e. seed count) of a particular seed aliquot based at least in part on an inventory amount of seeds available in the bulk sample such that agricultural research protocols may be optimized based on the inventory of seed available for research purposes.

These advantages, and others that will be evident to those skilled in the art, are provided in the package assembly of the present invention.

BRIEF DESCRIPTION OF THE DRAWINGS

Figure 1:
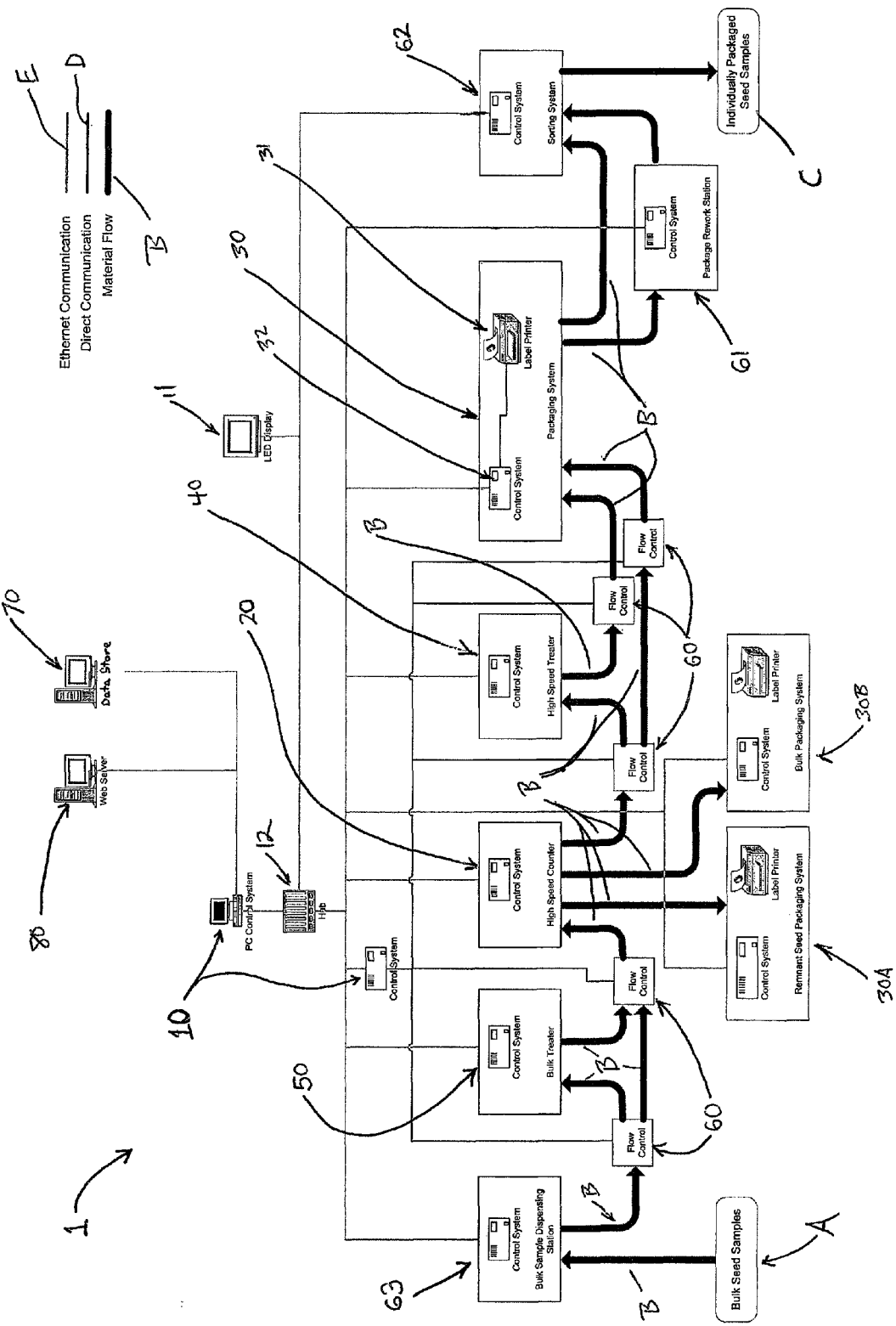
Figure 2:
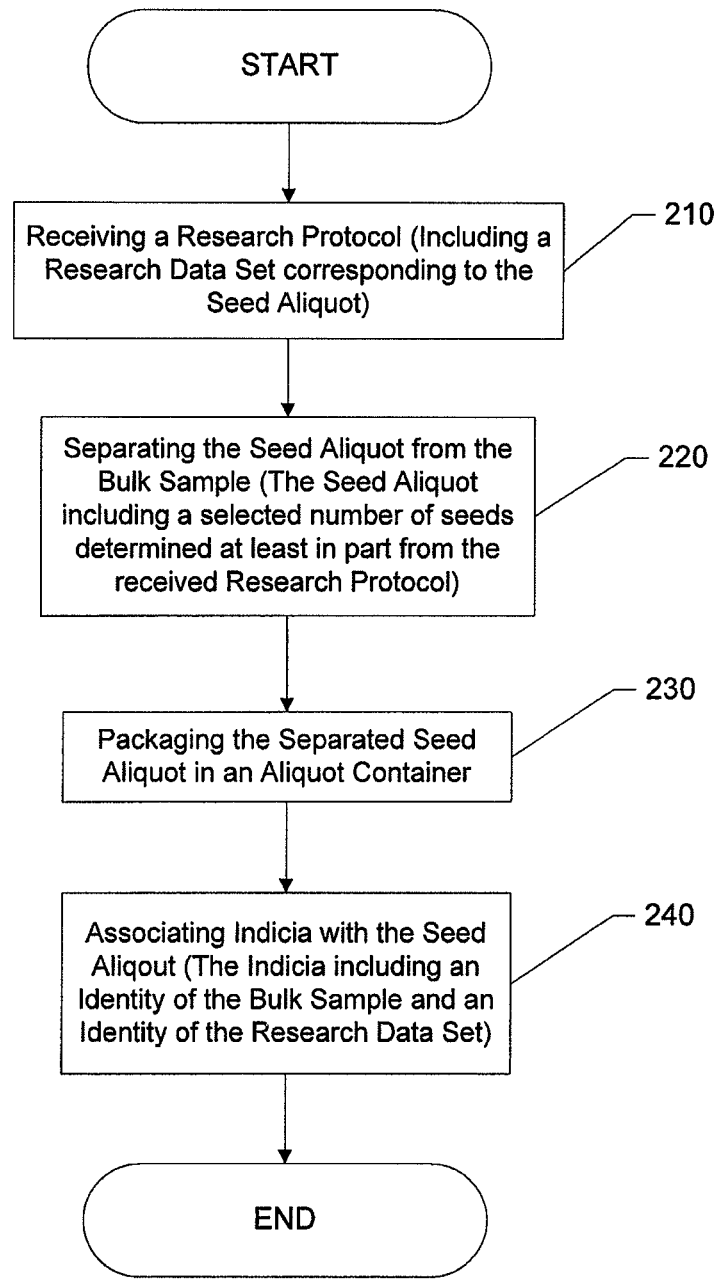
Figure 3:
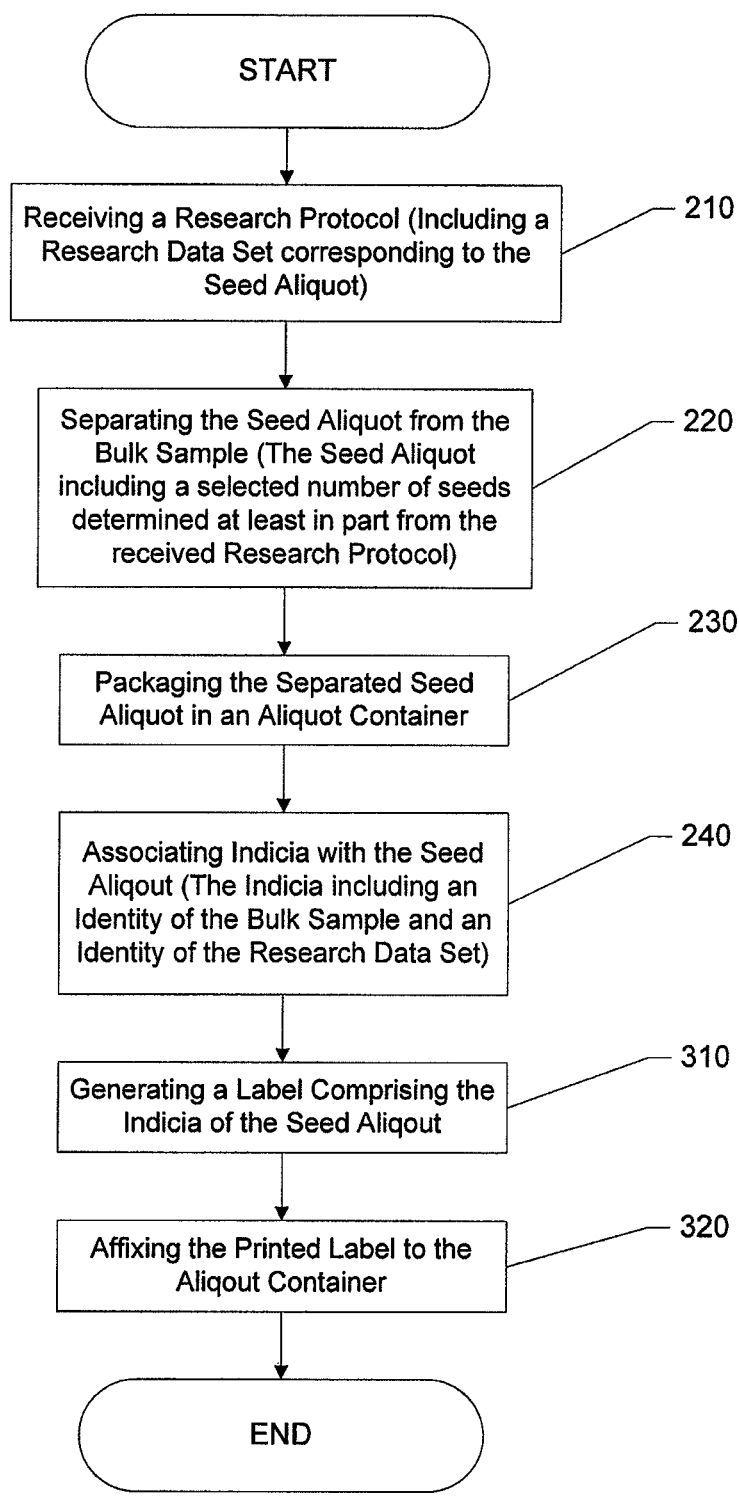
Figure 4:
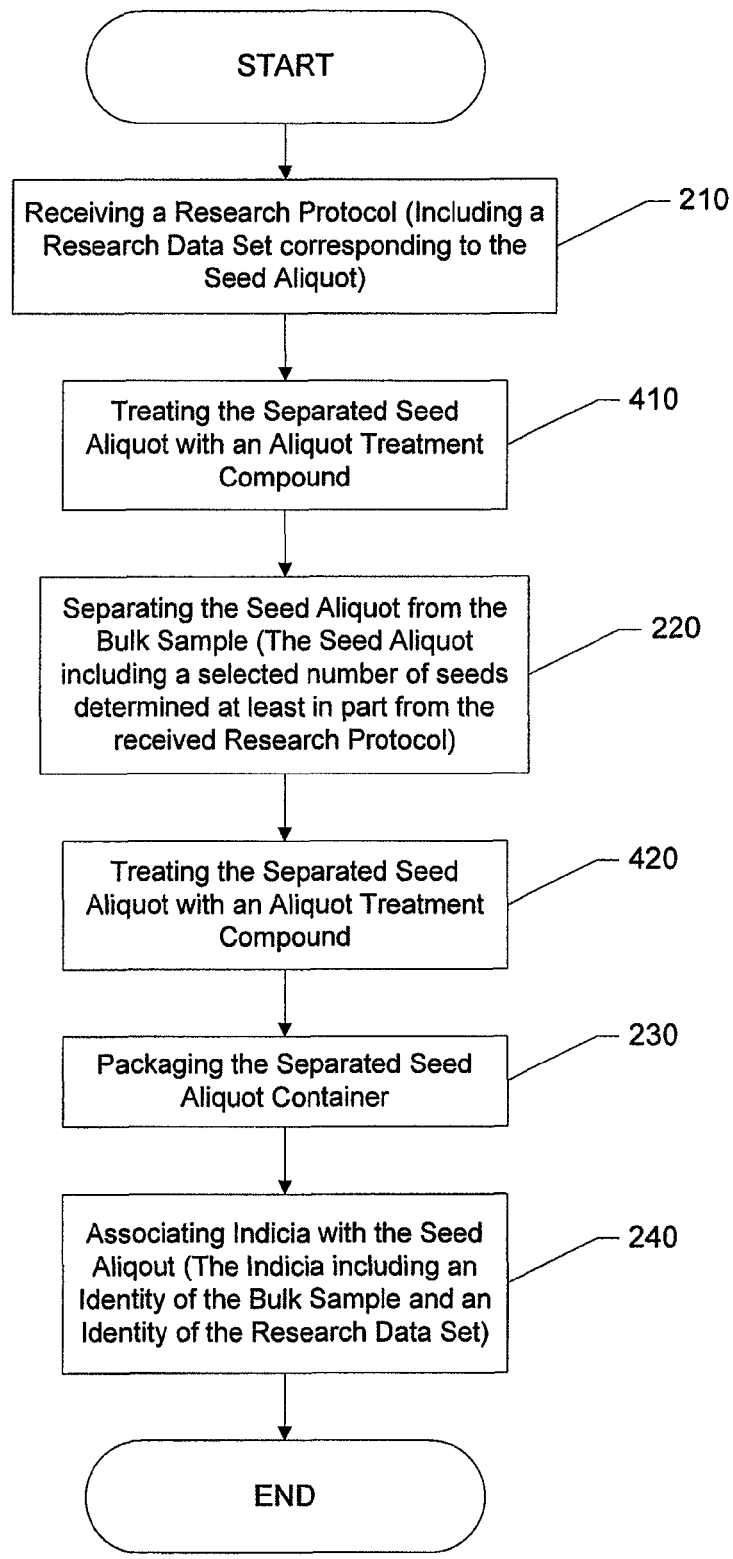
Figure 5:
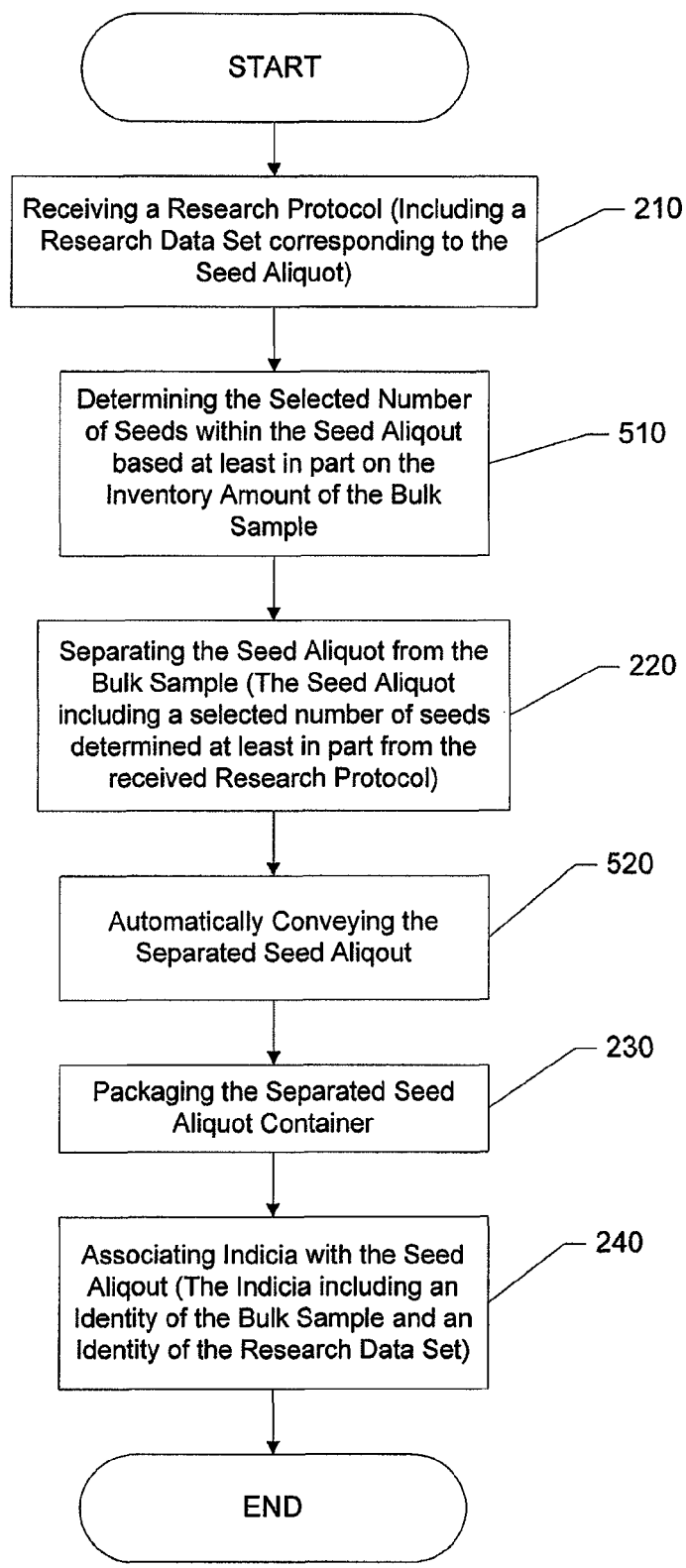
Figure 6:
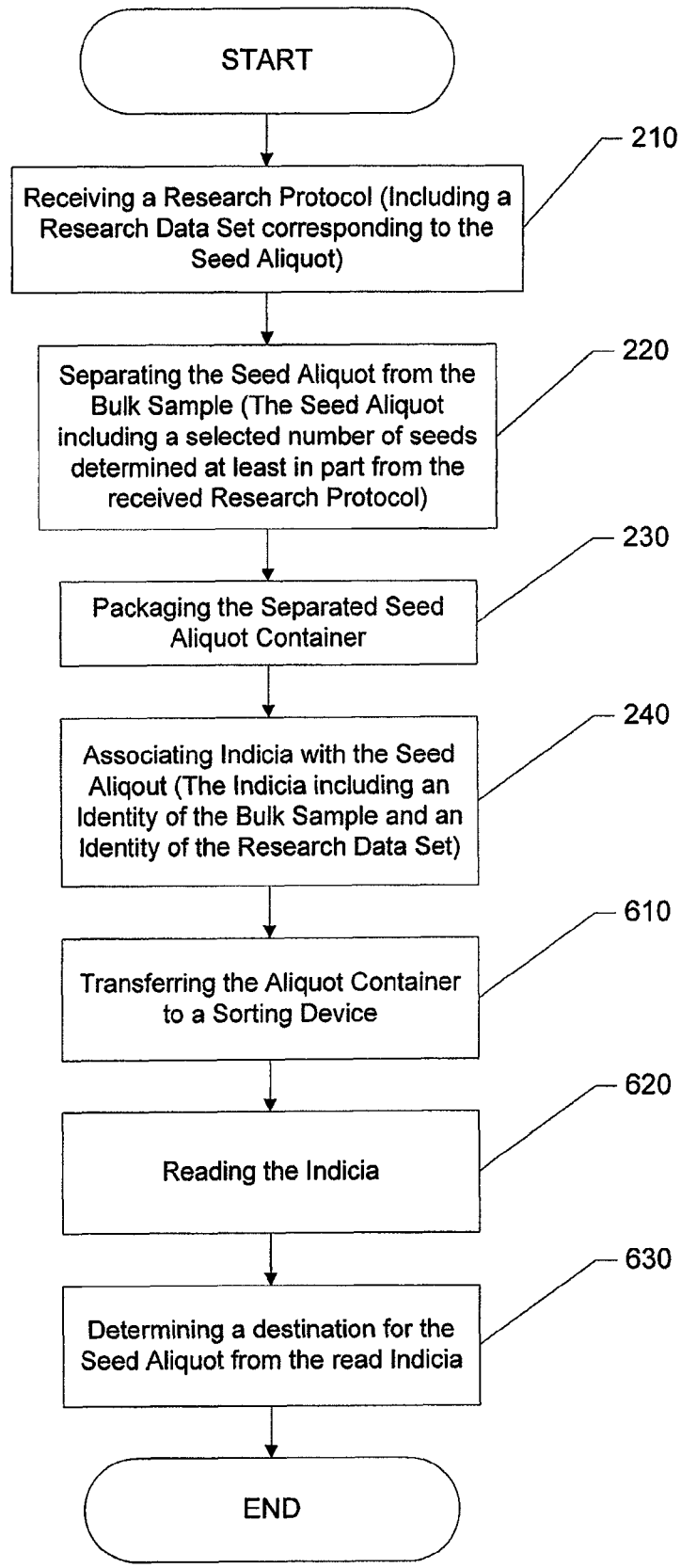
Figure 7:
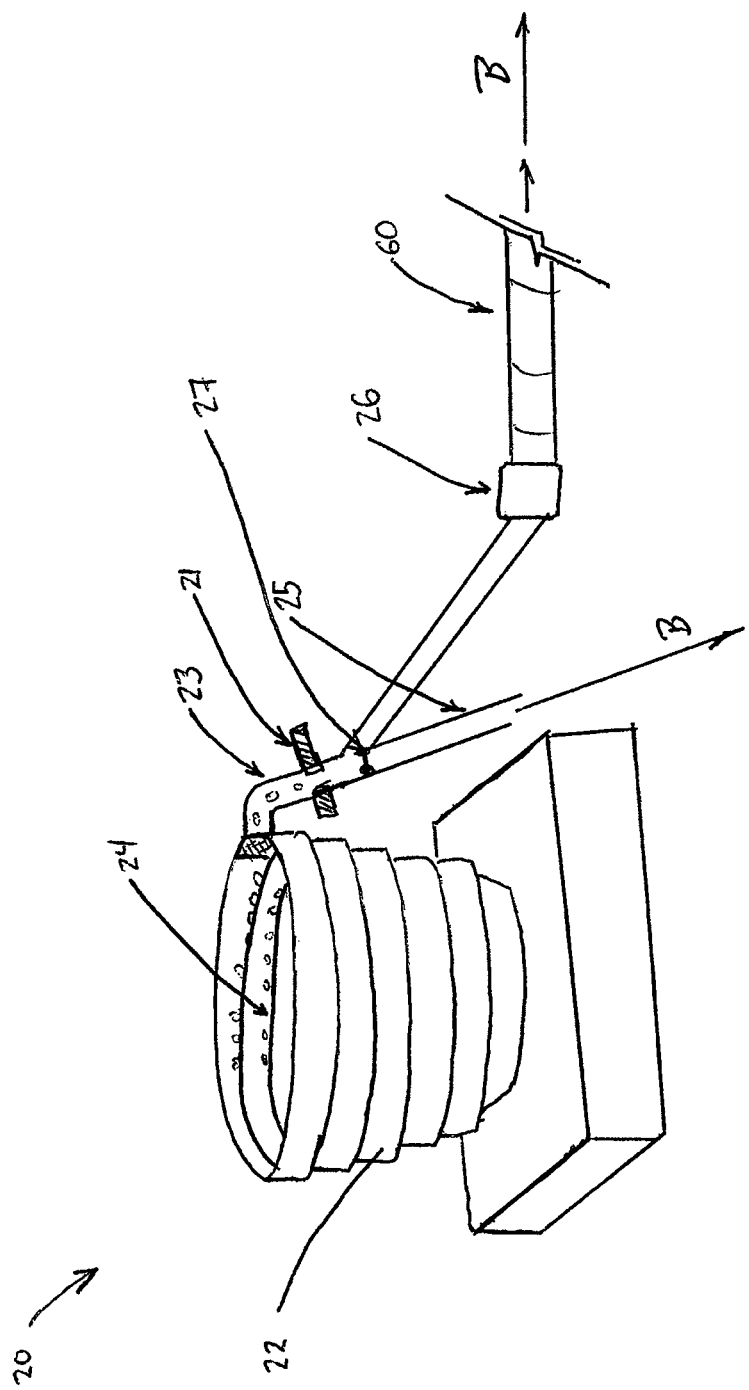
Figure 8:
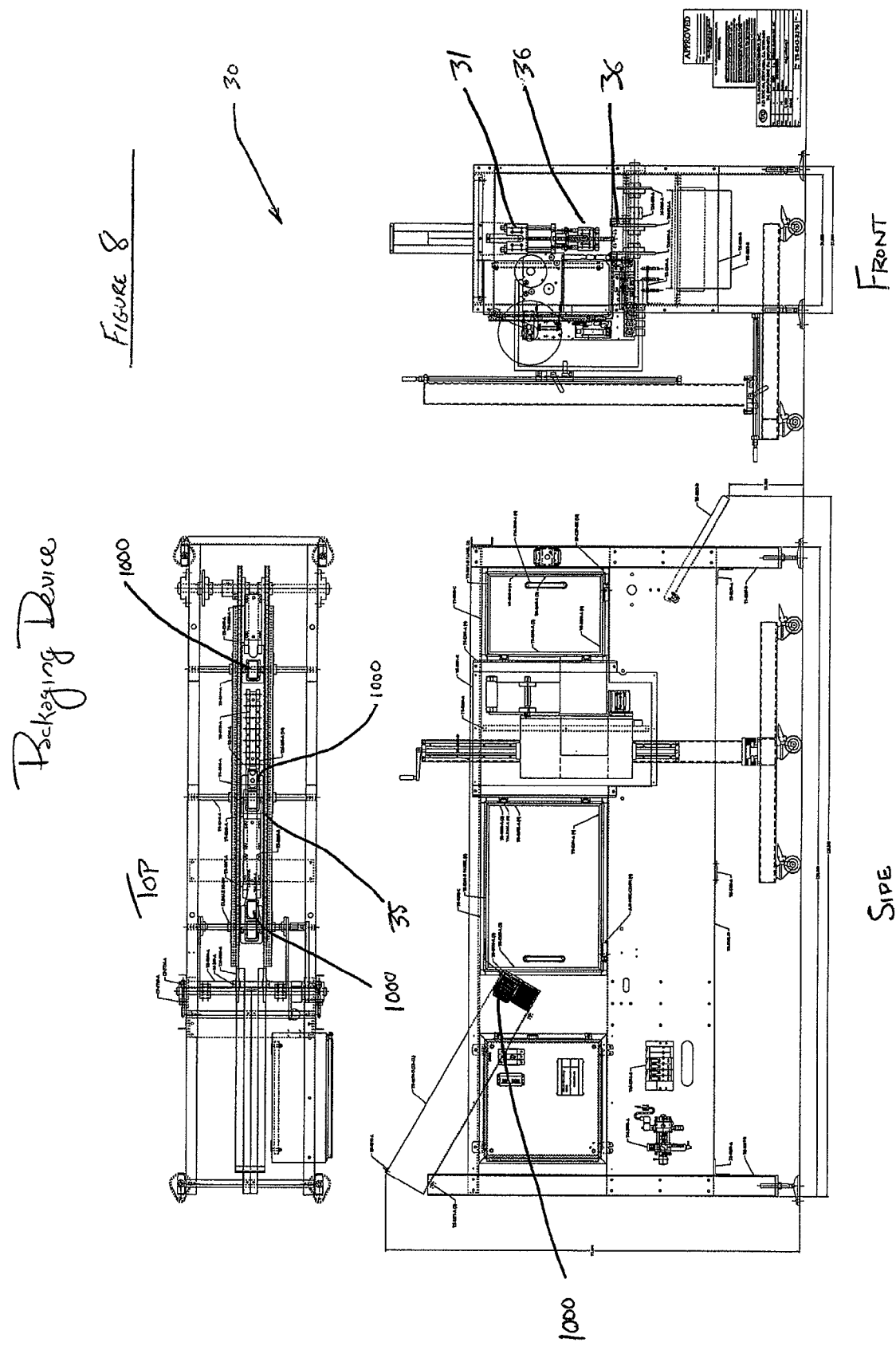
Figure 9:
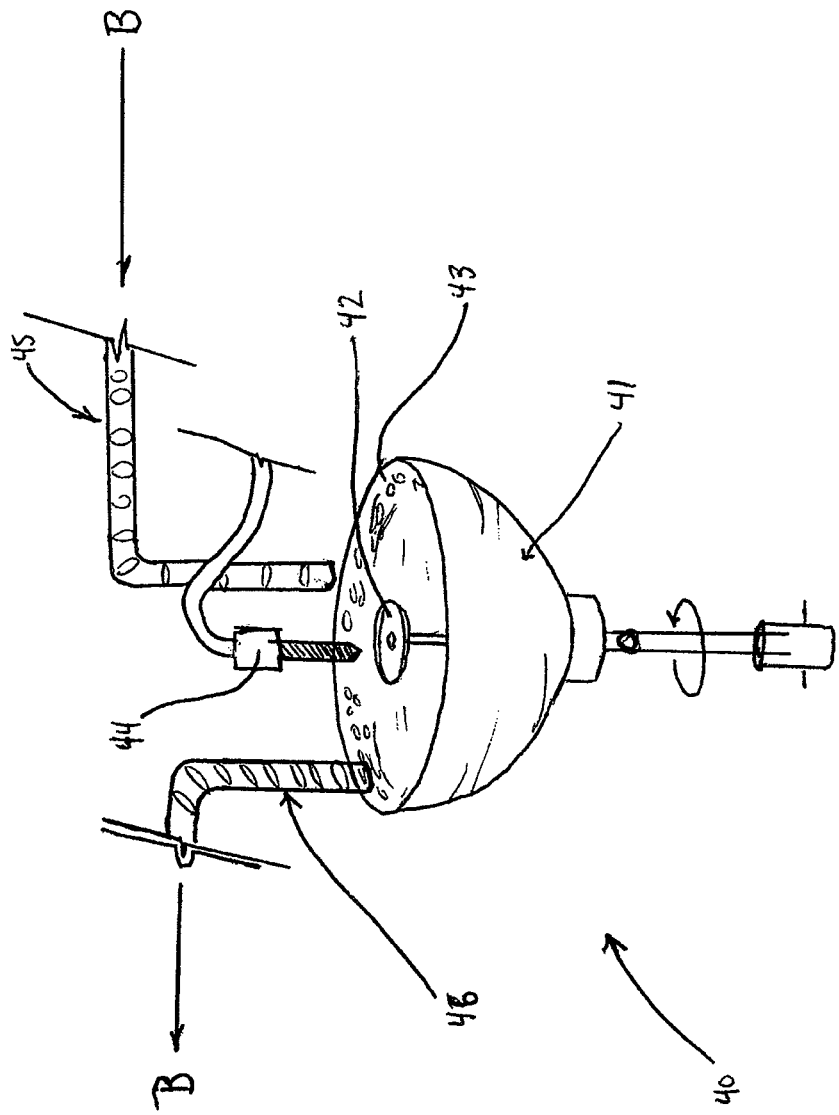
Figure 10:
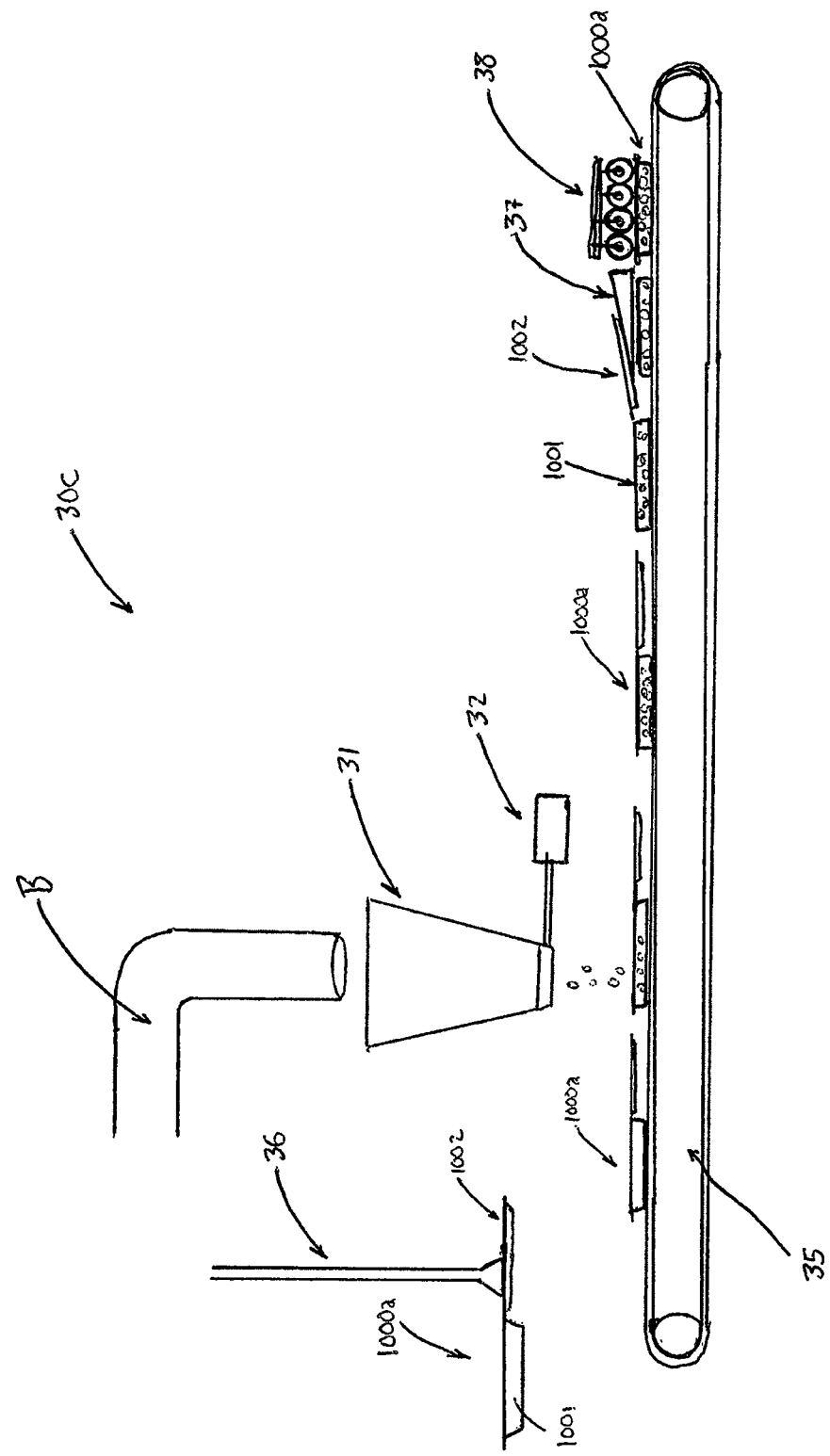
Figure 11:
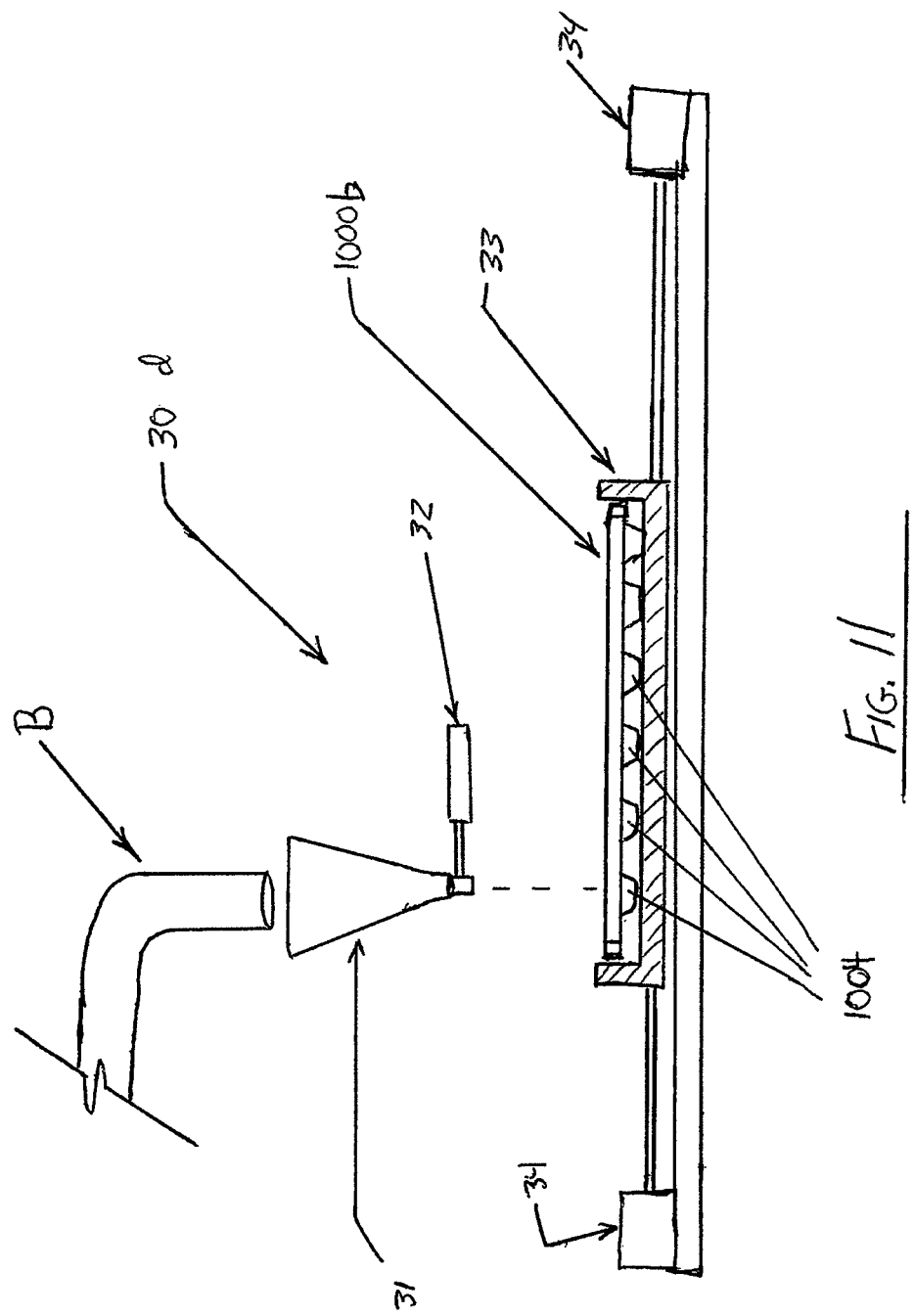
Figure 12:
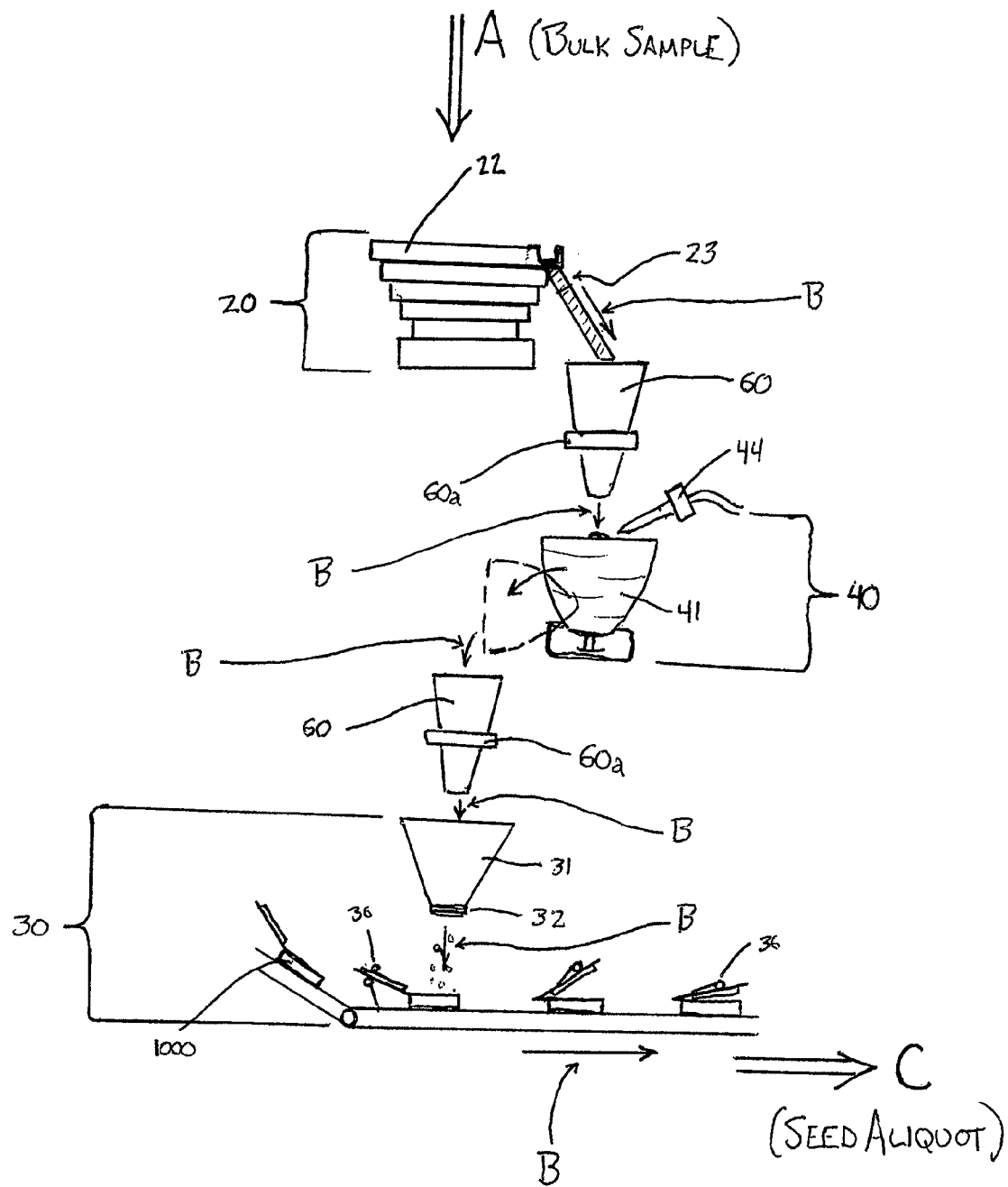
Figure 13:
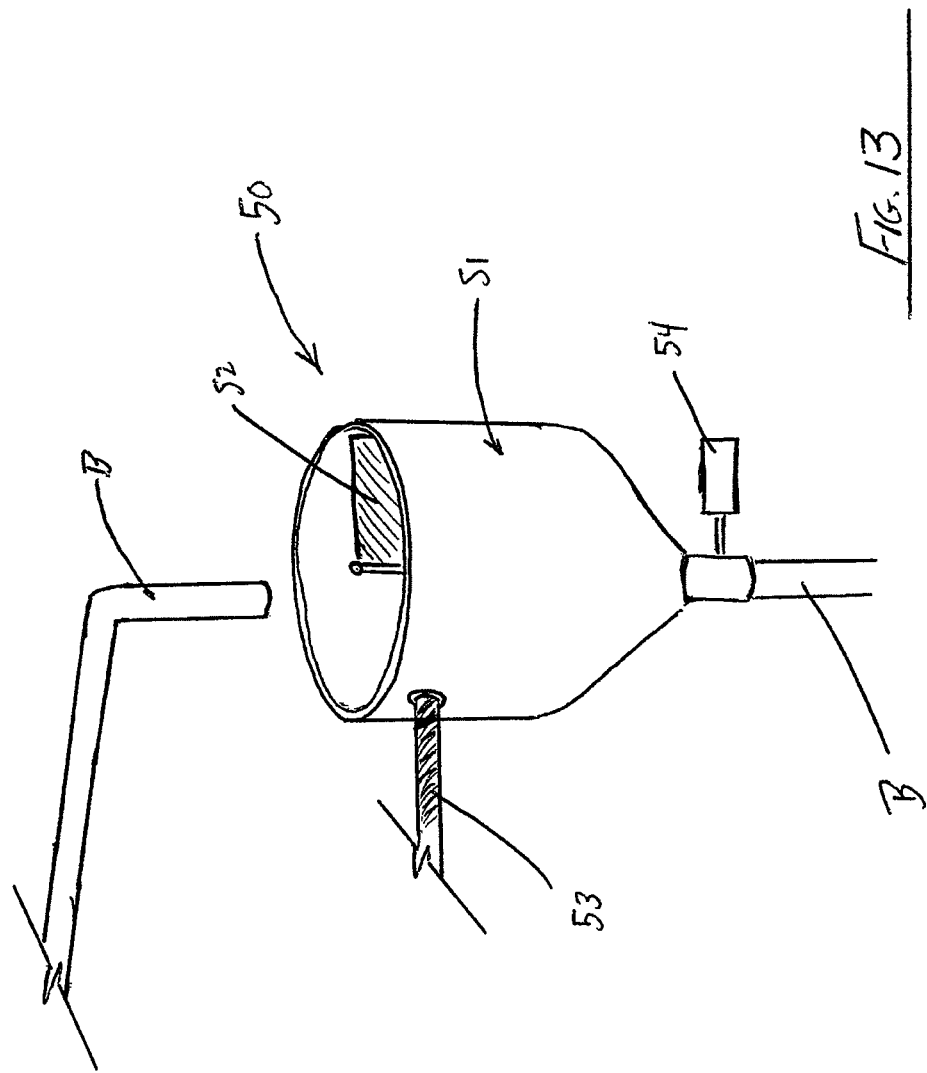

Having thus described the invention in general terms, reference will now be made to the accompanying drawings, which are not necessarily drawn to scale, and wherein:

FIG. 1 shows a flow chart schematic of a seed aliquot preparation system according to one embodiment of the present invention;

FIG. 2 shows a flow chart of a method, according to one embodiment of the present invention, including steps for receiving a research protocol, separating a seed aliquot from a bulk sample, packaging the seed aliquot, and assigning a unique indicia to the seed aliquot;

FIG. 3 shows a flow chart of a method, according to one embodiment of the present invention, including additional steps for generating a label including the indicia associated with the seed aliquot and affixing the printed label to the seed aliquot container in which the seed aliquot is packaged;

FIG. 4 shows a flow chart of a method, according to one embodiment of the present invention, including additional steps for treating the bulk sample with at least one bulk sample treatment compound and treating the separated seed aliquot with at least one aliquot treatment compound;

FIG. 5 shows a flow chart of a method, according to one embodiment of the present invention, including steps for determining the selected number of seeds within the seed aliquot based in part on an inventory amount of the bulk sample and automatically conveying the seed aliquot;

FIG. 6 shows a flow chart of a method, according to one embodiment of the present invention, including additional steps for transferring the aliquot container to a planting device, reading the indicia, and determining a planting location for the seed aliquot based on the read indicia;

FIG. 7 shows an exemplary counter device according to one embodiment of the present invention;

FIG. 8 shows an exemplary packaging device according to one embodiment of the present invention;

FIG. 9 shows an exemplary seed aliquot treatment device according to one embodiment of the present invention;

FIG. 10 shows a schematic view of a packaging device according to one embodiment of the present invention wherein the aliquot container comprises a well portion for receiving the seed aliquot and a lid portion for securing the seed aliquot within the well portion;

FIG. 11 shows a schematic view of a packaging device according to one embodiment of the present invention wherein the aliquot container comprises a plate including a plurality of wells for receiving a corresponding plurality of seed aliquots;

FIG. 12 shows a schematic side view of a system according to one embodiment of the present invention wherein the system components are oriented in a "stacked" configuration such that the seed conveyance path is oriented along a substantially vertical axis; and FIG. 13 shows an exemplary bulk sample treatment device according to one embodiment of the present invention.

DETAILED DESCRIPTION OF THE INVENTION

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

While the embodiments of the present invention are described below in the context of an agricultural research environment wherein the system, method, and computer program product embodiments may be used to receive, segregate, treat, contain, and selectively dispense seed aliquots containing one or more seeds of a particular type (such as, for example, seeds corresponding to a selected corn plant hybrid or genetically modified organism (GMO)), it should be understood that the embodiments of the present invention may also be used for receiving, segregating, containing, and selectively dispensing a variety of particles, components, powders, fluids, foods, and/or other items that may require temporary containment and/or segregation prior to being utilized for a downstream process. Embodiments of the present invention may thus be useful for segregating, treating, containing, and selectively dispensing such items when required.

FIG. 1 illustrates an exemplary system 1 for segregating a seed aliquot C from a bulk sample A and preparing the seed aliquot for planting in an agricultural research plot. It should be noted that in various embodiments, a seed aliquot may contain one or more seeds. According to one embodiment, the system 1 comprises a controller 10 for receiving a research protocol (from, for example, but not limited to, a data store 70 or web server computer device 80). The research protocol includes a research data set corresponding to the seed aliquot. According to some embodiments, the system 1 further comprises a data store 70 in communication with the controller 10, wherein the data store comprises the research protocol including the research data set corresponding to the seed aliquot. It should be noted that for the purposes of the current specification and appended drawings and claims, the term data store may include, but is not limited to, a database, text file, relational database, or any other manner of storing data. Additionally, communication with the data store may occur directly, indirectly, or any other combination. According to various embodiments, the data within the research data set may include, but is not limited to: the selected number of seeds within the seed aliquot C; a planting location wherein the packaged seed aliquot C is to be dispersed; bulk sample source information; an inventory amount of the bulk sample A; a treatment type required for the seed aliquot C; and combinations of such data. Bulk sample source information refers to any information relating to the bulk sample. In various embodiments, bulk sample source information may include, but is not limited to, the composition of the bulk sample (e.g., the bulk sample genotype or pedigree), where the bulk sample was produced, source information of the parental lines of the bulk sample, the season, year, and location that the seeds of the bulk sample were produced, etc.

The system 1 further comprises a counter device 20 in communication with the controller 10 and located on a conveyance path B defined by the various components of the system 1 (including, for example, the conveyor device 60 described in further detail herein). The counter device 20 is configured to receive the bulk sample A and to separate the seed aliquot C from the bulk sample A such that the seed aliquot C includes a selected number of seeds, wherein the selected number of seeds may be controlled at least in part from the received research protocol. It should be noted that for the purposes of the current specification and appended drawings and claims, the terms control system, controller, and other forms thereof, refer to any one or any combination of devices that may be used for controlling, including, but not limited to a personal computer (PC), a programmable logic controller (PLC), timers, processor devices, and other similar devices. In various embodiments, one or more processes may be controlled by one or more controllers, which may include one or more controller types. For example, in some embodiments, a combination of controllers may control one process. In other embodiments, a combination of controllers may control a combination of processes. In other embodiments, one controller may control all processes. In still other embodiments, different controllers may control different processes. Additionally, any combination of controller types is possible. For example, one or more processes may be controlled by a controller of one type, and another process or other processes may be controlled by one or more controllers of another type.

According to various embodiments, the counter device 20 may be configured to have the capacity to separate a seed aliquot having a variety of different seed quantities that may vary, for example, from a single seed to an infinite number of seeds. As shown in FIG. 7 the counter device 20 may be configured to receive the bulk sample A (directly from a marked bag, for example) in one or more counter device inlets 21. In some embodiments, the counter device 20 may comprise a machine reader device (such as a bar code scanner, for example) for reading a label affixed to a container containing the bulk sample A. The machine reader device may be configured to communicate with the controller 10 to transmit an identity of the bulk sample A to the controller 10 as the bulk sample 10 is received by the counter device 10. In some additional embodiments, as shown generally in FIG. 1, the system 1 may comprise a bulk sample dispensing station 63 for receiving the bulk sample A, reading an identity of the bulk sample A, and transmitting the identity of the bulk sample A to the controller 10. The bulk sample dispensing station 63 may be configured to remove the bulk sample A from a bulk sample container (such as a bag, canister, or other bulk sample container) and advance the bulk sample A along the conveyance path B (via one or more conveyor devices 60, as described further herein) to at least one of: a bulk sample treatment device 50 (for treating the entire bulk sample A with at least one bulk sample treatment compound such as a fungicide, insecticide, and/or a combination thereof); and a counter device 20 for separating a seed aliquot C from the bulk sample A.

As shown generally in FIG. 7, the counter device 20 may comprise a vibratory counter device including a stepped bowl 22 configured to singulate seeds from the bulk sample and pass the singulated seeds through a sensor device 21 (which may be located, for example, along an exit chute 23 in communication with an exit aperture defined near an upper periphery of the stepped bowl 22 of the counter device 20). The sensor device 21 may comprise, in some embodiments, a photo-optic sensor configured to count the singulated seeds (as they pass between a photodiode and an optic sensor, for example) to control the selected number of seeds within the seed aliquot C. For example, in some embodiments, the counter device may comprise a commercially-available seed counter (such as the Seedburo 801 Count-A-Pak vibratory counter device manufactured by Seedburo Equipment Company in Chicago, Ill.). In such embodiments, the seeds of the bulk sample A may be loaded into the stepped bowl 22 of the counter device 20 such that as the stepped bowl 22 is vibrated, the seeds may be lined up in single file along a periphery of the tracks 24 defined on the steps of the stepped bowl 22 and advanced towards an exit aperture and out through an exit chute 23 that may be fitted with the sensor device 21 for counting the seeds of the seed aliquot C. The exit chute 23 may be in communication with a pneumatic manifold 26 and/or an inlet of a pneumatic tube or other component used to define the conveyance pathway B.

The remaining seeds of the bulk sample A may be removed from the counter device 20 via a remnant seed outlet 25 (and/or a suction tube) that may be configured to draw remaining seeds of the bulk sample out of the counter device 20 and into an alternate conveyance pathway B leading (as shown generally in FIG. 1) to a remnant seed packaging system 30a or a bulk seed packaging system 30b configured to bag the remaining seeds of the bulk sample A. The exit chute 23 may further comprise one or more valve devices 27 (such as electromechanical, electro-pneumatic, and/or electrically actuated valves or doors) for directing the seed aliquot towards the pneumatic manifold 26 leading to the main conveyance pathway B. The valve device 27 may be selectively actuated (by, for example, a controller device integrated with the counter device 20 and/or by the controller 10 of the system 1) in order to direct the remaining seeds of the bulk sample A to the remnant seed packaging system 30a or the bulk seed packaging system 30b (see FIG. 1, for example) configured to bag the remaining seeds of the bulk sample A. Each of these packaging systems 30a, 30b may also comprise a printing device (such as a label printer, for example) for preparing a label for identifying the remnant seeds of the bulk sample A such that the remaining seeds may be used in the preparation of additional seed aliquots C in response to a subsequent research protocol (received from a data store 70, for example).

According to various other system 1 embodiments, the counter device 20 may also comprise additional controllable automated counting systems that may be in communication with the controller 10 and the conveyance pathway B defined by one or more conveyor devices 60. For example, in some embodiments, automated vibratory "shaker" tables or plates (and/or stepped bowls 22, as described herein) may be used to singulate the seeds of a bulk sample A such that they may be individually counted to form a seed aliquot C having a selected number of seeds. In other embodiments, various types of commercially-available counting devices (such as, for example, the Contador seed counter device manufactured by Hoffman Manufacturing Incorporated) or other particle counting systems may be used as the counter device 20 or as a component thereof. Such counter devices 20 may be modified to include an outlet (such as a pneumatic manifold 26) that may be configured to be in communication with an inlet of a pneumatic tube or other component used to define the conveyance pathway B. As described herein, the counter device 20 (and/or various computer-controlled components thereof) may be in communication with the controller 10 of the system 1 in order to ensure that the counting process utilized to generate the seed aliquot C is closely controlled and/or monitored such that the number of seeds within each seed aliquot C is in accordance with the received research protocol.

As shown in FIG. 1, the system 1 further comprises a packaging device 30 in communication with the controller 10 and located on the conveyance path B (downstream of the counter device 20). The packaging device 30 is configured to receive the separated seed aliquot C and to dispense the seed aliquot into an aliquot container (such as, for example, the seed aliquot container 1000a, shown generally in FIG. 10). In the depicted embodiment, the packaging device 30 is further configured to cooperate with the controller 10 to associate an indicia with the seed aliquot C. In the depicted embodiment, the indicia pertains to an identity of the bulk sample A and an identity of the research data set corresponding to the received research protocol, such that the seed aliquot is identifiable at least partially from the indicia. It should be noted that in various embodiments indicia may pertain, directly or indirectly, to a variety of information. For example, in some embodiments indicia may pertain directly to an identity of the seed aliquot and/or the bulk sample. In other embodiments, indicia may comprise one or more alpha and/or numeric symbols that pertain, by reference to a data store, to identities of the seed aliquot and/or the bulk sample. In other embodiments, indicia may be such that the seed aliquot and/or bulk sample is at least partially identifiable directly from the indicia. In other embodiments, indicia may represent data contained in RFID device. It should be noted that in some additional embodiments, more than one aliquot of seed may be associated with the same indicia. The indicia associated with the seed aliquot C may be associated, in some embodiments, by the controller 10 prior to the arrival of the seed aliquot C at the packaging device 30 by tracking (via, for example, the network connections E established between the various components of the system 1 and the controller 10) the progress of a particular seed aliquot C from its arrival in the system 1 as part of a bulk sample A to its packaging by the packaging device 30 and its subsequent dispersal and/or planting by a planter device. An example of a subsequent dispersal process is disclosed in U.S. patent application No. 11/774,205, entitled "Method of Handling Clamshell Containers Containing a Particulate Aliquot," which is hereby incorporated by reference herein in its entirety. In some embodiments, a device configured to generate a visual representation of the indicia may be included. In the depicted embodiment, the packaging device 30 further comprises a device configured to generate a visual representation of the indicia, including, but not limited to, a marking device (such as a laser etching device, ink-jet printing device, and/or laser printing device) configured to generate a visual representation of the unique indicia on a surface of the aliquot container 1000/1000a. The packaging device 30 may, in some embodiments, also be configured to physically associate the indicia with the seed aliquot by affixing a radio frequency identification (RFID) device to the seed aliquot container 1000a/1000b wherein the RFID tag includes the indicia (which, as discussed further herein, may include a number of processing details related to the preparation of the seed aliquot C (including tracing the seed aliquot C to a particular bulk sample A of seeds)). In other embodiments, an RFID tag or other device may be pre-installed and/or integrated into the seed aliquot container 1000a/1000b and the packaging device 30 may comprise an RFID "write" device (such as a radio transmitter) configured to write the indicia to the pre-installed and/or integrated RFID device. Although shown to be associated by a packaging device in the depicted embodiment, in other embodiments indicia may be associated with a seed aliquot in any manner and by any device.

In some embodiments, the packaging device 30 further comprises a printing device 31 and a printing device control system 32, wherein the printing device 31 is configured to generate a label comprising the indicia of the seed aliquot. The label generated by the printing device 31 may comprise human or machine-readable indicia, such as for example, alphanumeric information, bar code information, or other indicia that may be read by individuals or machines in downstream processes (such as by a bar code scanner included as part of a downstream processing step and/or verification step located, for example, along the conveyance pathway B). In some system 1 embodiments, the packaging device 30 may be further configured to affix the printed label to the aliquot container 1000a (see FIG. 10, for example) at a position on the aliquot container 1000a that may be readable by a bar code scanner when the aliquot container 1000a is transferred to a downstream processing step (such as a bulk packaging and/or planting step).

As shown in FIGS. 8 and 10, in some embodiments, the aliquot container 1000a comprises a well portion 1001 for receiving the seed aliquot and a lid portion 1002 for securing the seed aliquot within the well portion. For example, in some embodiments, the aliquot container may comprise a clamshell container such as that disclosed in U.S. patent application No. 11/774,256, entitled "Buckling Clamshell Container for Automated Aliquot and Dispersal Processes, " which claims priority from U.S. Provisional Application No. 60/806,660, also entitled "Buckling Clamshell Container for Automated Aliquot and Dispersal Processes," both of which are hereby incorporated by reference herein in their entirety. According to some such embodiments, the packaging device 30 may be optimized for manipulating an aliquot container 1000a comprising such a well portion 1001 and an attached hinged lid portion 1002. For example, in such embodiments, the packaging device may comprise a packaging conveyor 35 configured to advance the aliquot container 1000a to a filling position in communication with the conveyance path B (see FIG. 10, for example). The packaging device 30 may further comprise a filling hopper 31 for receiving the separated seed aliquot from the conveyance path B and at least one packaging valve mechanism 32 (such as the electrically-controlled pneumatic actuators described herein with respect to the conveyor device 60) operably engaged with the filling hopper 31 (at a bottom section, for example) for selectively allowing the separated seed aliquot to fill the well portion 1001 of the aliquot container 1000a in response to a gravity force. As shown generally in FIG. 10, the packaging device 30c may further comprise an automated arm element 36 configured to retrieve an open aliquot container 1000a (which may, in some embodiments, be provided as a nested stack of open aliquot containers 1000a) from a stock of containers and place the aliquot container onto a conveyor 35 so that the aliquot container is advanced to a filling position relative to the filling hopper 31. Furthermore, the packaging device may further comprise a wedge 37 disposed relative to the conveyer device 35 configured to lift the lid portion 1002 (relative to the well portion 1001), and a "skate wheel" device 38 configured to press the lid portion 1002 into a closed position relative to the well portion 1001 of the aliquot container 1000*a* after the seed aliquot C is dispensed into the aliquot container 1000*a*.

As shown in FIG. 11, the aliquot container 1000*b* may, in some embodiments, comprise a plate 1000*b* including a plurality of wells 1004 for receiving a corresponding plurality of seed aliquots. The plurality of wells 1004 may be arranged in an array corresponding to the received research protocol such that each well is designed to contain a specific seed aliquot. According to such embodiments, the packaging device 30*d* comprises an actuator device 34, configured to advance each of the plurality of wells 1004 to a filling position (relative to a filling hopper 31 and a corresponding packaging valve mechanism 32) in communication with the conveyance path B such that each of the plurality of seed aliquots may be dispensed into the corresponding plurality of wells 1004 of the plate 1000*b* in accordance with the received research protocol. The actuator device 34 of the packaging device 30*d* may comprise an automated movable X-Y table 34 including a register device 33 (such as a carrier plate defining a register indentation for receiving the plate 1000*b*). Thus, the register device 33 is configured to receive the aliquot container 1000*b* in a fixed position relative to the automated movable X-Y table 34 as shown generally in FIG. 11 such that as the actuator device 34 is capable of precisely advancing each of the wells 1004 to the filling position relative to the filling hopper 31 and the corresponding packaging valve mechanism 32).

In some embodiments, and as shown generally in FIG. 1, the system 1 may further comprise an aliquot treatment device 40 in communication with the controller 10 and located on the conveyance path B downstream of the counter device 20. The aliquot treatment device 40 may be configured to treat the separated seed aliquot with at least one aliquot treatment compound. According to some such embodiments, the packaging device 30 may be further configured to associate an indicia comprising an identity of the at least one aliquot treatment compound. According to some embodiments, as shown generally in FIG. 9, the aliquot treatment device 40 includes a seed aliquot inlet 45 in communication with the conveyance path B for conveying the seed aliquot into a centrifugal coating device (such as, for example the HEGE 11 Liquid Seed Treater manufactured by Wintersteiger AG of Austria). The aliquot treatment device 40 may comprise, for example, a rotatable bowl 41 for receiving the seed aliquot C and distributing the seeds within the seed aliquot towards a radial periphery 43 of the rotatable bowl 42 via an application of centrifugal force (via the rotation of the bowl 42 imparted, for example by a drive shaft operably engaged with a motor). The centrifugal aliquot treatment device 40 further comprises a rotatable disk 42 disposed concentrically within the rotatable bowl 41 and configured to apply the at least one aliquot treatment compound to the distributed seeds. For example, the aliquot treatment device 40 may further comprise an aliquot treatment compound dispensing device 44 (such as an electro-pneumatic and/or electro-mechanically controlled syringe) for dispensing the at least one aliquot treatment compound (such as a powdered, semi-liquid, and/or liquid insecticide or fungicide, for example) onto the rotatable disk 42 as it is spinning within the rotatable bowl 42 such that the aliquot treatment compound is distributed evenly onto the peripherally-distributed seeds via the applied centrifugal force. The aliquot treatment device 40 may also comprise a seed aliquot outlet 46 for selectively removing the treated seed aliquot from the rotatable bowl (via the application of a suction force, for example) and conveying the treated seed aliquot to the conveyance pathway B. Alternatively, in some embodiments wherein the aliquot treatment device 40 is located vertically above the packaging device 30 and/or other downstream processing station, the aliquot treatment device 40 may comprise a mechanism for tilting and/or overturning the rotatable bowl 41 (see FIG. 12, for example) and dumping the treated seed aliquot into a hopper device (see, for example, element 60, FIG. 12) that may consolidate the treated seed aliquot and convey the aliquot to a downstream processing step (see, for example, the vertically "stacked" conveyance pathway B shown in FIG. 12). Other aliquot treatment devices 40 (and/or components thereof) may include, but are not limited to: the HEGE 14 Liquid Seed Treater (also manufactured by Wintersteiger); Wintersteiger's HEGE 12 Liquid Seed Treater (which may be used, for example, to treat seed aliquots that have been pre-distributed in well-plate aliquot containers using compressed air to agitate the seeds within the seed aliquot (see element 1000*b* of FIG. 11, for example)); the Cimbria Heid CC10 Centricoater (manufactured by Seedburo Equipment Company of Chicago Ill.); and Seedburo's Batch Lab Treater (BLT) (which includes a rotatable drum for coating relatively small-number seed aliquots with at least one aliquot treatment compound). The BLT embodiment of the aliquot treatment device 40 may comprise a rotatable drum aliquot treatment device configured to separate the seeds within the seed aliquot and apply the at least one aliquot treatment compound to the seeds within the seed aliquot via a syringe (such as the aliquot treatment compound dispensing device 44 shown generally in FIG. 9) disposed substantially adjacent to the rotatable drum. Furthermore, the HEGE 12 Liquid Seed Treater embodiments of the aliquot treatment device 40 may comprise a magazine aliquot treatment device defining at least one well for receiving the seed aliquot. The magazine aliquot treatment device may further comprise a nozzle for selectively conveying a source of compressed air into the at least one well to selectively agitate the seeds within the seed aliquot. Furthermore, the magazine aliquot treatment device may also comprising an aliquot treatment compound dispenser disposed adjacent to the nozzle and configured to apply the at least one aliquot treatment compound to the agitated seeds.

In such embodiments (and as shown schematically in FIG. 1) the aliquot treatment device 40 (and/or an integrated controller device in communication therewith) may be in communication with the controller 10 of the system 1 in order to ensure that the at least one aliquot treatment compound is applied in accordance with the received research protocol. For example, the controller 10 may control the aliquot treatment compound dispensing device 44 (such as an electro-pneumatic and/or electromechanically-controlled syringe) for dispensing the at least one aliquot treatment compound into the aliquot treatment device 40 such that the type and/or quantity of aliquot treatment compound may be monitored and/or controlled by the controller 10 in accordance with the received research protocol.

In some embodiments, as shown in FIG. 1, the system 1 may also comprise a bulk sample treatment device 50 in communication with the controller 10 and located on the conveyance path B upstream of the counter device 20. The bulk sample treatment device 50 is configured to treat the bulk sample A with at least one bulk sample treatment compound. Furthermore, according to some such embodiments, the packaging device may be further configured to associate an indicia comprising an identity of the at least one bulk sample treatment compound. Thus, in some embodiments, the aliquot treatment device 40 and the bulk sample treatment device 50 may communicate with the controller 10 to receive the research protocol associated with at least one of a particular bulk sample A and/or a seed aliquot separated therefrom such that the bulk sample A and/or a seed aliquot separated therefrom may be treated with at least one of a bulk sample treatment compound and at least one seed aliquot treatment compound (that may be tailored for each particular seed aliquot separated from the bulk sample A via the counter device 20). As described further herein, the various bulk sample treatment compounds and/or seed aliquot treatment compounds may comprise fungicides, insecticides, or other treatment compounds that may be applied to the seeds within a bulk sample and/or to the seeds within a particular seed aliquot. As shown in FIG. 13 the bulk sample treatment device 50 may comprise an agitator chamber 51 configured to receive the bulk sample A (via the conveyance pathway B) and the at least one bulk sample treatment compound (via a bulk sample treatment compound inlet 53 defined in the walls of the agitator chamber 51. Furthermore, the agitator chamber also comprises an agitator arm 52 which, as shown generally in FIG. 13 may be rotatably mounted on a central agitator stem extending upward from a central axis of the agitator chamber 51. The agitator arm 52 may be configured to rotate within the agitator chamber 51 (about the central agitator stem, for example) so as to substantially coat the seeds within the bulk sample A with the at least one bulk sample treatment compound that may enter the chamber 51 via the bulk sample treatment compound inlet 53. The chamber 51 may further define a bulk sample outlet that may be opened and/or closed via a valve device 54 (comprising, for example an electro-pneumatic actuator that mat be in communication with the controller 10 for controlling a flow of the bulk sample A along the conveyance pathway B.

According to various other embodiments of the present invention, the bulk sample treatment device 50 may comprise other types of treatment devices for coating the seeds within the bulk sample A substantially evenly with the at least one bulk sample treatment compound, such as, for example, sprayers, centrifugal liquid seed coaters (such as the HEGE 11 and 14 devices described herein with respect to the seed aliquot treatment device 40, as shown generally in FIG. 9), and other types of bulk coating devices suitable for coating large numbers of particles with a liquid, powdered, and/or semi-liquid treatment compound (such as a fungicide or insecticide that may make up the at least one bulk sample treatment compound). In other embodiments, a bulk sample treatment device 50 may comprise an agitator chamber that is configured to receive at least a portion of the bulk sample and the at least one bulk sample treatment compound, and an agitator arm, the agitator chamber being configured to rotate around the agitator arm so as to substantially coat the seeds within the bulk sample with the bulk sample treatment. In another embodiment, an agitator chamber may be operated in a tilted orientation and may include an integrated agitator arm, the agitator chamber being configured to receive at least a portion of the bulk sample and the at least one bulk sample treatment compound, and being further configured to rotate so as to substantially coat the seeds within the bulk sample with the bulk sample treatment. In another embodiment, an agitator chamber may operate in a substantially horizontal orientation, the agitator chamber being configured to receive at least a portion of the bulk sample and the at least one bulk sample treatment compound, and being further configured to rotate about a substantially horizontal axis so as to substantially coat the seeds with the bulk sample within the bulk sample with the bulk sample treatment. In another embodiment, an agitator chamber may operate in a substantially vertical orientation, the agitator chamber being configured to receive at least a portion of the bulk sample and the at least one bulk sample treatment compound, and being further configured to rotate about a substantially vertical axis so as to substantially coat the seeds with the bulk sample within the bulk sample with the bulk sample treatment. In another embodiment, an agitator chamber may operate in a substantially vertical orientation, the agitator chamber including a substantially concave bottom portion, the agitator chamber being configured to receive at least a portion of the bulk sample, the bottom portion being configured to rotate about a substantially vertical axis so as to accelerate the seed sample upward and toward an inner periphery of the agitator chamber where it intercepts an atomized bulk treatment compound so as to substantially coat the seeds with the bulk sample within the bulk sample with the bulk sample treatment. In another embodiment, a fluidized treatment device may be configured to receive at least a portion of the bulk sample and the at least one bulk sample treatment compound and to lift the seeds in an air stream so as to create a fluidized mass wherein the seeds are exposed to the treatment compound so as to substantially coat the seeds with the bulk sample within the bulk sample with the bulk sample treatment.

As shown in FIG. 1, the system 1 of the depicted embodiment may further comprise a conveyor device 60 in communication with the controller 10 and cooperable therewith to determine the conveyance path B at least partially from the received research protocol. For example, the conveyor device 60 may be configured to automatically convey the bulk sample A and the seed aliquot C along the determined conveyance path (i.e. to one or more of the various components of the system 1, such as the bulk treatment device 50, the counter device 20, the aliquot treatment device 40, and the packaging device 30). It should be noted that for purposes of the current specification and appended drawings and claims, the term automatic, automatically, and other forms thereof refer to operations that require little if any manual intervention. The conveyor device may thus ensure that the separated seed aliquot C is maintained separately from the bulk sample A along the determined conveyance path B in accordance with the received research protocol. According to some system 1 embodiments of the present invention, the conveyor device 60 may comprise a series of pneumatic actuators (controlling, valves and/or doors along the conveyance path B) and air jets connected by a conveyance path B defined by at least one pneumatic conveyance tube (such as a relatively small-diameter, clear flexible tubing). Thus, the various components of system 1 may be linked by the conveyance path B defined by the conveyor device 60.

As shown in FIG. 1, the system 1 may be linked not only by the conveyance path B, but also a combination of electrical and pneumatic circuits (see element D shown in FIG. 1, which may make up the various components of a conveyor device 60) such that the conveyor device 60 may be directly controllable by the controller 10. For example, the conveyor device 60 may comprise a plurality of gates and doors operated by electrically-controlled pneumatic actuators (solenoid operated). Such actuators may have two-way ported cylinders that are actuatable to one of two states by placing higher pressure on one side of the cylinder ram and creating lower pressure on the other side relative to one state or the other. Many of such actuators may hold doors or gates in a normally closed state, but when actuated, move a gate or door to an open state to create a conveyance path B for the bulk sample A (and/or a seed aliquot derived therefrom) to pass. In addition, the conveyor device 60 may also comprise one or more air jets that may also be electrically controlled, via a series of actuators connected by various electrical connections D to the controller 10). Examples of particular pneumatic cylinders that may be used for building the components of the conveyor device 60 include, but are not limited to: Models 6-DP-1-M, 6-DP-2-M, or 6-DP-3-M from Humphrey Products Company of Kalamazoo, Mich., or Model 2A710 pancake cylinders from Speedaire.

By referring again to FIG. 1, it may be appreciated that the controller 10 may control the various actuators of the conveyor device 60 by communicating with the solenoids associated with each actuator by sending an electrical signal (via the electrical connections D, for example), which energizes the solenoid. The solenoid energizes its actuator supplying the compressed air to a pneumatic cylinder (two-way) that has two states. The compressed air pushes the ram of the air cylinder. This mechanical force is then usable to open and close doors or gates, and to open and close pathways for compressed air that may define the conveyance path B. The electrically-controlled actuators making up the conveyor device 60 may also comprise electrical sensors (such as, for example, Model BIM-PST-AP6X-V1131 inductive sensors from Turck of Minneapolis, Minn.) associated therewith for informing the controller 10 of the state of the actuator. Thus, the controller 10 may monitor the state of each component of the conveyor device 60 (such as whether the gates or doors are open or closed).

As shown in FIG. 1, the controller 10 may comprise a processing hub 12, one or more displays 11, and a data entry interface (such as, for example, a touch screen, mouse, or keyboard). Thus, an operator of the system 1 may quickly change various operating parameters of the system 1 via the controller. As shown in FIG. 1, the system 1 (and the controller 10 thereof) may also be in communication with a web server 80 and data store 70 (as described in further detail herein), such that the operating parameters of the system 1 may also be monitored and/or modified remotely via a wired (see the network connections E, shown generally in FIG. 1) and/or a wired or wireless computer network (such as the internet). The controller 10 may be programmed, for example, to send digital instructions (via the network connections E, for example) at appropriate times to one or more of the components of the system 1 (including the conveyor device 60 defining the conveyance path B), such that the seed aliquots C prepared by the system 1 are maintained separately from the bulk sample A along the determined conveyance path B in accordance with the received research protocol. According to some system 1 embodiments, the controller 10 may implement computer software to time the operating parameters of the various system 1 components so that they need not operate continuously (such as when a portion of the bulk sample A or when a seed aliquot is not present in a particular component of the system 1). Furthermore, in some alternate embodiments, the processor 10 may control the components (including the conveyor device 60 components) to allow more than one bulk sample A and/or more than one seed aliquot C prepared therefrom to be in process, but in different sections of, system 1 substantially simultaneously.

According to other embodiments, as shown for example, in FIG. 12, the various components of the system 1 may be stacked in a substantially vertical arrangement such that the conveyance path B is oriented along a substantially vertical axis. According to some such embodiments, the conveyor device comprises at least one hopper device 60 including at least one valve mechanism 60a (such as the electrically-controlled pneumatic actuators described herein) operably engaged therewith (at a bottom section, for example) for selectively allowing the separated seed aliquot C to advance along the determined conveyance path B in response to a gravity force. According to such embodiments, the force of gravity may convey the various seed aliquots C along the conveyance path B. As described herein, the flow of the various bulk samples A and seed aliquots C prepared therefrom may be controlled by the actuation of the solenoid-controlled valve mechanisms 60a disposed near a bottom section of each hopper device defining the conveyor device 60.

As shown in FIG. 1, the conveyance path B (and the conveyor devices 60 defining such a conveyance path B) may be configured to carry the seed aliquot C from the packaging system 30 to one or more quality-control stations (such as a packaging rework station 61 and/or a sorting system 62. The packaging rework station 63 may comprise a bar code reader or other detection device configured to be capable of detecting the assigned unique indicia (or a label that may be affixed to the seed aliquot container 1000a/1000b) to ensure that the unique indicia has been properly assigned to the seed aliquot C in accordance with the received research protocol. The packaging rework station 63 may comprise a second packaging device 30 for re-packaging the seed aliquot C to conform to the received research protocol and to ensure that the packaged seed aliquot C is properly assigned a unique indicia prior to passing the seed aliquot C on to downstream processes such as bulk packaging, planting, and/or sorting (see, the sorting system 62, shown in FIG. 1). The sorting system 62 may comprise, for example, an automated system in communication with the controller 10 (via a network connection E, for example) configured to sort the packaged seed aliquots C according to the assigned unique indicia such that the seed aliquots may be more easily identified and/or segregated for downstream processes such as planting the packaged seed aliquots C in one or more specific planting locations in accordance with the received research protocol. For example, the sorting system 62 may comprise one or more bar-code readers or other scanning devices configured to be capable of reading the unique indicia assigned to and/or affixed to the aliquot containers 1000a/1000b.

As shown generally in the flow diagrams of FIGS. 2-6, additional embodiments may further provide a method for segregating a seed aliquot C from a bulk sample A and preparing the seed aliquot C for planting in an agricultural research plot. As shown in FIG. 2, one embodiment of the method comprises the following steps: step 210 for receiving a research protocol (the research protocol including a research data set corresponding to the seed aliquot C); step 220 for separating the seed aliquot C from the bulk sample using a counter device 20 (see, for example, the rotary counter device shown in FIG. 7); step 230 for packaging the separated seed aliquot C in an aliquot container using a packaging device 30 (see the exemplary packaging devices shown in FIGS. 11 and 12); and step 240 for associating indicia with the seed aliquot C. As described herein, the indicia includes an identity of the bulk sample A and an identity of the research data set corresponding to the received research protocol, such that the seed aliquot C may be identifiable at least partially from the indicia.

According to some method embodiments, the receiving step 210 may comprise receiving the research protocol from an input source that may include, but is not limited to: a research data store 70; a user interface 11 for receiving a user input comprising the research data set; a memory device (included as part of the controller 10 or in communication therewith, for example) for storing default values comprising the research data set; combinations of such input sources. According to various embodiments, as shown in FIG. 1 for example, the receiving step 210 may comprise receiving the research protocol from one or more of the input sources via a network connection E established between one or more of the input sources and the controller 10. Furthermore, the research data set (included as part of the received research protocol) may, according to various method embodiments, comprise data that may include, but is not limited to: the selected number of seeds within the seed aliquot C; a planting location wherein the packaged seed aliquot C is to be dispersed; bulk sample source information; an inventory amount of the bulk sample; and combinations of such data. Furthermore, according to some embodiments, the receiving step 210 may further comprise receiving a research protocol including a research data set that sets out an identity of the at least one aliquot treatment compound (to be applied, for example, by a seed aliquot treatment device 40) and/or an identity of the at least one bulk sample treatment compound (to be applied, for example, by a bulk sample treatment device 50).

Furthermore, according to some method embodiments of the present invention, the associating step 240 (shown, for example in FIG. 2) may comprise associating indicia to each seed aliquot C that is separated from the bulk sample A as part of the separating step 220 by tracking the seed aliquot C as it is advanced along the conveyance path B defined by the components of the conveyor device 60. In some embodiments, the associating step 240 be performed by solely by the controller 10 and may comprise compiling processing details (such as the application of bulk sample treatments (step 410) and seed aliquot treatments (step 420)) and storing traceability details (such as the identity of the bulk sample A from which a particular seed aliquot C is separated as part of step 220). The associating step 240 may also comprise steps for affixing an RFID tag to the seed aliquot container 1000a/1000b wherein the RFID tag includes the indicia. The assigning step 240 may also comprise "writing" to a pre-installed and/or integrated RFID device included as a component of the seed aliquot container 1000a/1000b. The assigning step 240 may comprise physically generating a visual representation of the indicia on a surface of the aliquot container 1000/1000a (using, for example, an etching device, laser etching device, laser printing device, and/or ink-jet printing device).

As shown in FIG. 3, various method embodiments of the present invention may further comprise step 310 for generating a label comprising the indicia of the seed aliquot, and step 320 for affixing the printed label to the aliquot container. Steps 310 and 320 may be performed, for example, by the packaging device 30 (described generally herein and shown in FIG. 8). According to various embodiments, the label generated in step 310 may comprise a machine readable (i.e. bar code label or other machine-readable indicia) and/or human-readable (i.e. alphanumeric) string of data that may be indicative of the unique indicia assigned to a particular seed aliquot C as part of step 240. As described herein, the label generated and affixed in steps 310 and 320 may also comprise an RFID tag including the indicia. The label generated and affixed to the aliquot container 1000a/1000b in steps 310 and 320 may be used by the various components of the system 1 embodiments of the present invention to track and/or segregate the seed aliquot C as it is passed along the conveyance path B (defined, for example, by the conveyor device 60, described herein).

FIG. 4 shows another embodiment of the method of the present invention comprising steps for applying treatment compounds (such as fungicides, insecticides, or other treatment compounds) to the bulk sample A and/or the separated seed aliquot C. For example, the method may further comprise step 410 for treating the separated seed aliquot C (such as the output of the counter device 20, for example) with at least one aliquot treatment compound using an aliquot treatment device 40 (such as the aliquot treatment device 40 shown generally in FIG. 9 and described herein). According to some such embodiments, the aliquot treatment device 40 may be in direct communication with the controller 10 (via a network connection E, for example) such that the assigned unique indicia further comprises an identity of the at least one aliquot treatment compound applied as part of step 410.

Furthermore, as shown in FIG. 4, some method embodiments of the present invention may further comprise step 420 for treating at least a portion of the bulk sample A with at least one bulk sample treatment compound (such as a fungicide, insecticide, or other treatment compound) using a bulk sample treatment device 50 (see FIG. 13, for example). The bulk sample treatment device 50 may be located on the conveyance path B upstream of the counter device 20 for treating the entire bulk sample A with at least one bulk sample treatment compound. Furthermore, as shown generally in FIG. 1, the bulk sample treatment device 50 may be in communication with the controller 10 such that an identity of the at least one bulk sample treatment compound added to a particular bulk sample A may be transmitted to the controller 10 such that a unique indicia assigned to any seed aliquot C resulting from the treated bulk sample A further comprises an identity of the at least one bulk sample treatment compound applied as part of step 420.

As shown in FIG. 5 some method embodiments of the present invention may further comprise step 510 for determining the selected number of seeds within the seed aliquot C (i.e. the number of seeds separated from the bulk sample A as part of step 220) based at least in part on an inventory amount of the bulk sample A. For example, the controller 10 may be capable of adjusting the selected number of seeds separated from the bulk sample A so as to ensure that the selected number of seeds within each seed aliquot C optimally conform to the seed population requirements outlined in the received research protocol without prematurely depleting the inventory of the bulk sample A. For example, a particular received research protocol may specify a seed aliquot population of 45 seeds per seed aliquot from a particular bulk sample and that 5 seed aliquots are to be prepared from the bulk sample A. According to some embodiments (as shown generally in FIG. 1), the bulk sample dispensing station 63 may be capable of estimating and/or precisely determining an inventory amount of the bulk sample A and transmitting (via the network connections E, for example) the inventory amount to the controller 10. Thus, according to step 510, the controller 10 may determine that the bulk sample inventory amount includes only 200 seeds (20 short of the 220 total seeds required for the specified research protocol). Furthermore, as part of step 510, the controller may be further configured to determine that the statistically-significant threshold for a minimum number of seeds per seed aliquot C is 40 seeds. In other embodiments, the statistically-significant threshold for a minimum number of seeds per seed aliquot C may be included as part of the received research protocol. In any case, step 510 may comprise determining that the selected number of seeds within the prepared seed aliquots C should be 40 seeds per aliquot in order to avoid depleting the bulk sample A inventory prior to preparing the required 5 seed aliquots. It should be noted that in other embodiments, steps may be included that prioritize plots that require a specific seed type such that the plots may be filled in priority order. Additionally, other embodiments may include allocation and prioritization steps so as to maximize the number of plots that may be planted from a limited seed source. Furthermore, other embodiments may include steps that use information relating to genetically equivalent sources of seed that may be utilized to supply lower priority locations or to supply seed to one or several replicated plots within a single experimental location so as to pool differences between seed sources with other defined sources of variation.

Also, as shown in FIG. 5, the method may further comprise step 520 for automatically conveying the separated seed aliquots C along the conveyance path B defined between the various components of the system 1 embodiments of the present invention. Step 520 may be performed, for example, by a conveyor device 60 (such as a system of pneumatic tubes and actuators controlled by the central controller 10 via a series of electrical connections D and network connections E as shown in FIG. 1 and as discussed further herein). Step 520 comprises steps that may include, but are not limited to: automatically conveying the separated seed aliquot between the separating step 220 and the packaging steps 230; automatically conveying the separated seed aliquot between the separating step 220 and the treating step 420 (see FIG. 4, for example); automatically conveying the treated bulk sample between the bulk sample treating step 410 and the separating step 220 (see also, FIG. 4, for example). As described herein, in some embodiments, the automatically conveying step 520 may further comprise controlling a series of valve mechanisms for controlling and segregating seed aliquots C as they are allowed to fall (by the force of gravity, for example) through a vertically "stacked" arrangement of system components (as shown, for example, in FIG. 12).

FIG. 6 shows an additional method embodiment of the present invention including various steps for: receiving a packaged seed aliquot C (such as, for example, a product of steps 210-240); reading the unique indicia assigned to the seed aliquot C; and For example, such method embodiments may further comprise step 610 for transferring the aliquot container 1000a/1000b to a sorting device 62 (via, for example, the conveyance path B (which may be specially modified for post-packaging conveyance of packaged seed aliquots). The method may further comprise step 620 for reading the assigned unique indicia (assigned, for example, as part of step 240) printed on the label affixed to the aliquot container 1000a/1000b (see steps 310 and 320 shown in FIG. 3 and discussed herein) using a machine reader device (such as a bar-code scanner, for example) operably engaged with and/or in communication with the sorting device 62. Finally, as shown generally in FIG. 6, the method may further comprise step 630 for determining a destination for the packaged seed aliquot based on the read indicia. For example, the sorting device 62 may be capable of determining at least one or a planting location and/or shipping location of one or more packaged seed aliquots based on the read unique indicia. Thus, the sorting device 62 may route the packaged seed aliquots to a downstream planting step (for automated and/or hand planting based on GPS coordinates and/or row/field indicia corresponding to the read unique indicia). In other embodiments, the sorting device 62 may route the packaged seed aliquots to a downstream shipping step (for shipping to an address and/or research site corresponding to the read unique indicia). Thus, the method embodiment of FIG. 6 may ensure that the packaged seed aliquot is routed to a particular research location for planting and/or additional processing steps in accordance with the received research protocol.

In addition to providing apparatus and methods, the present invention also provides computer program products for performing the operations described above. The computer program products have a computer readable storage medium having computer readable program code embodied in the medium. The computer readable storage medium may be part of a storage device and may implement the computer readable program code to perform the above discussed operations.

In this regard, FIGS. 2-6 are block diagram illustrations of methods and program products according to the invention. It will be understood that each block or step of the block diagram and combinations of blocks in the block diagram can be implemented by computer program instructions. These computer program instructions may be loaded onto a computer (such as, for example, the controller 10 illustrated schematically as part of the system 1 embodiment shown in FIG. 1) or other programmable apparatus to produce a machine, such that the instructions which execute on the computer or other programmable apparatus implement the functions specified in the block diagram, flowchart or control flow block(s) or step(s). These computer program instructions may also be stored in a computer-readable memory that can direct a computer or other programmable apparatus to function in a particular manner, such that the instructions stored in the computer-readable memory produce an article of manufacture including instructions which implement the function specified in the block diagram, flowchart or control flow block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the block diagram, flowchart or control flow block(s) or step(s).

Accordingly, blocks or steps of the block diagram, flowchart or control flow illustrations support combinations of instructions for performing the specified functions, combinations of steps for performing the specified functions and program instructions for performing the specified functions. It will also be understood that each block or step of the block diagram, flowchart or control flow illustrations, and combinations of blocks or steps in the block diagram, flowchart or control flow illustrations, can be implemented by special purpose hardware-based computer systems which perform the specified functions or steps, or combinations of special purpose hardware and computer instructions.

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for segregating a seed aliquot from a bulk sample and preparing the seed aliquot for planting in an agricultural research plot based at least in part on a research protocol, the system comprising:
   a controller configured for receiving a research protocol that includes a research data set corresponding to the seed aliquot, the research data set including at least a planting location wherein the seed aliquot is to be dispersed;
   a counter device located on a conveyance path, the counter device being configured to receive at least a portion of the bulk sample and to separate the seed aliquot from the portion of the bulk sample such that the seed aliquot includes a selected number of seeds; wherein the selected number of seeds is determined at least in part from the research protocol; and a packaging device in communication with the counter device and located on the conveyance path downstream of the counter device, the packaging device being configured to receive the separated seed aliquot and to dispense the seed aliquot into an aliquot container.

2. A system according to claim 1, wherein indicia is associated with the seed aliquot.

3. A system according to claim 2, wherein the indicia pertains to an identity of the bulk sample.

4. A system according to claim 2, further comprising a device configured to generate a visual representation of the indicia on a surface of the aliquot container.

5. A system according to claim 2, further comprising a device configured to generate a label comprising the indicia of the seed aliquot.

6. A system according to claim 5, further comprising a device configured to affix the printed label to the aliquot container.

7. A system according to claim 1, further comprising one or more aliquot treatment devices located on the conveyance path downstream of the counter device, the aliquot treatment devices being configured to treat the separated seed aliquot with at least one aliquot treatment compound.

8. A system according to claim 2, further comprising an aliquot treatment device located on the conveyance path downstream of the counter device, the aliquot treatment device being configured to treat the separated seed aliquot with at least one aliquot treatment compound, and wherein the indicia pertains to at least an identity of the at least one aliquot treatment compound.

9. A system according to claim 1, further comprising a bulk sample treatment device located on the conveyance path upstream of the counter device, the bulk sample treatment device being configured to treat at least a portion of the bulk sample with at least one bulk sample treatment compound.

10. A system according to claim 2, further comprising a bulk sample treatment device located on the conveyance path upstream of the counter device, the bulk sample treatment device being configured to treat at least a portion of the bulk sample with at least one bulk sample treatment compound, and wherein the indicia pertains to at least an identity of the at least one bulk sample treatment compound.

11. A system according to claim 1, further comprising a conveyor device configured to determine the conveyance path, the conveyor device being further configured to automatically convey the bulk sample and the seed aliquot along the determined conveyance path such that the separated seed aliquot is maintained separately from the bulk sample along the determined conveyance path in accordance with the research protocol.

12. A system according to claim 11, wherein the conveyance path is oriented along a substantially vertical axis and wherein the conveyor device comprises at least one hopper device including at least one valve mechanism operably engaged therewith for selectively allowing the separated seed aliquot to advance along the determined conveyance path in response to a gravity force.

13. A system according to claim 11, wherein the conveyor device comprises at least one pneumatic conveyor device and wherein the conveyance path determined thereby comprises at least one pneumatic conveyance tube.

14. A system according to claim 1, wherein the counter device is further configured to singulate seeds from the bulk sample, the counter device being further configured to pass the singulated seeds through a sensor device, the sensor device being configured to count the singulated seeds to determine the selected number of seeds within the seed aliquot.

15. A system according to claim 1, wherein the aliquot container comprises a well portion for receiving the seed aliquot and a lid portion for securing the seed aliquot within the well portion and wherein the packaging device comprises:

a packaging conveyor, the packaging conveyor being configured to advance the aliquot container to a filling position in communication with the conveyance path;

an automated arm element, the automated arm element being configured to place an open aliquot container on the packaging conveyor;

a static wedge disposed adjacent to the packaging conveyor for at least partially closing the lid portion relative to the well portion of the aliquot container; and a plurality of wheels disposed adjacent to the packaging conveyor downstream of the static wedge and configured to secure the lid portion in a closed position relative to the well portion of the aliquot container.

16. A system according to claim 1, wherein the aliquot container comprises a plate including one or more wells for receiving one or more seed aliquots, the wells arranged in an array corresponding to the received research protocol, and wherein packaging device comprises an actuator device, the actuator device being configured to advance each of the plurality of wells to a filling position in communication with the conveyance path such that each of the plurality of seed aliquots is dispensed into the corresponding plurality of wells of the plate in accordance with the received research protocol.

17. A system according to claim 16, wherein the actuator device is selected from the group consisting of:

an automated movable X-Y table including a register device, the register device being configured to receive the aliquot container in a fixed position relative to the automated movable X-Y table;

an X-Y gantry system;

an X-Y-Z gantry system;

a robotic arm configured to move in multiple axes; and combinations thereof.

18. A system according to claim 7, wherein the aliquot treatment device comprises a seed treater device selected from the group consisting of:

a rotatable drum aliquot treatment device configured to separate the seeds within the seed aliquot and apply the at least one aliquot treatment compound to the seeds within the seed aliquot via a dispensing device disposed substantially adjacent to the rotatable drum;

a centrifugal aliquot treatment device comprising a rotatable bowl for receiving the seed aliquot and distributing the seeds within the seed aliquot towards a periphery of the rotatable bowl via an application of centrifugal force, the centrifugal aliquot treatment device further comprising a rotatable disk disposed concentrically within the rotatable bowl and configured to apply the at least one aliquot treatment compound to the distributed seeds;

a magazine aliquot treatment device defining at least one well for receiving the seed aliquot, the magazine aliquot treatment device comprising a nozzle for selectively conveying a source of compressed air into the at least one well to selectively agitate the seeds within the seed aliquot, the magazine aliquot treatment device further comprising an aliquot treatment compound dispenser disposed adjacent to the nozzle configured to apply the at least one aliquot treatment compound to the agitated seeds; and combinations thereof.

19. A system according to claim 7, wherein the at least one aliquot treatment compound comprises a compound selected from the group consisting of:

a fungicide;

an insecticide; and combinations thereof.

20. A system according to claim 9, wherein the bulk sample treatment device comprises a seed treater device selected from the group consisting of:

an agitator chamber, the agitator chamber being configured to receive at least a portion of the bulk sample and the at least one bulk sample treatment compound, the agitator chamber comprising an agitator arm, the agitator arm being configured to rotate within the agitator chamber so as to substantially coat the seeds within the bulk sample with the bulk sample treatment;

a centrifugal bulk sample treatment device comprising a rotatable bowl for receiving at least a portion of the bulk sample and distributing the seeds within the bulk sample towards a periphery of the rotatable bowl via an application of centrifugal force, the centrifugal bulk sample treatment device further comprising a rotatable disk disposed concentrically within the rotatable bowl and configured to apply the at least one aliquot treatment compound to the distributed seeds; and combinations thereof.

21. A system according to claim 9, wherein the at least one bulk sample treatment compound comprises a compound selected from the group consisting of:

a fungicide;

an insecticide; and combinations thereof.

22. The system according to claim 1, further comprising at least one controller for controlling the system based at least in part on the research protocol.

23. A system according to claim 22, further comprising one or more data stores in communication with the at least one controller, the one or more data stores comprising the research protocol including the research data set corresponding to the seed aliquot, data within the research data set selected from the group consisting of:

a seed aliquot genotype or pedigree;

bulk sample source information;

the selected number of seeds within the seed aliquot;

a planting location wherein the packaged seed aliquot is to be dispersed;

an inventory amount of the bulk sample;

a treatment type; and combinations thereof.

24. A system according to claim 3, wherein the indicia further pertains to an identity of the research data set.

25. A system for segregating a seed aliquot from a bulk sample and preparing the seed aliquot for planting in an agricultural research plot based at least in part on a research protocol, the system comprising:

a counter device located on a conveyance path, the counter device being configured to receive at least a portion of the bulk sample and to separate the seed aliquot from the portion of the bulk sample such that the seed aliquot includes a selected number of seeds; and a packaging device in communication with the counter device and located on the conveyance path downstream of the counter device, the packaging device being configured to receive the separated seed aliquot and to dispense the seed aliquot into an aliquot container, wherein the aliquot container comprises a well portion for receiving the seed aliquot and a lid portion for securing the seed aliquot within the well portion and wherein the packaging device comprises:

a packaging conveyor, the packaging conveyor being configured to advance the aliquot container to a filling position in communication with the conveyance path;

an automated arm element, the automated arm element being configured to place an open aliquot container on the packaging conveyor;

a static wedge disposed adjacent to the packaging conveyor for at least partially closing the lid portion relative to the well portion of the aliquot container; and a plurality of wheels disposed adjacent to the packaging conveyor downstream of the static wedge and configured to secure the lid portion in a closed position relative to the well portion of the aliquot container.

* * * * *